United States Patent
Wetenkamp

(10) Patent No.: US 10,973,241 B2
(45) Date of Patent: Apr. 13, 2021

(54) FROZEN FOOD PRODUCT DISPENSING MACHINES HAVING REMOVABLE SPIGOTS

(71) Applicant: The Vollrath Company, L.L.C., Sheboygan, WI (US)

(72) Inventor: Ken Wetenkamp, Plymouth, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 16/657,889

(22) Filed: Oct. 18, 2019

(65) Prior Publication Data

US 2020/0045992 A1   Feb. 13, 2020

Related U.S. Application Data

(63) Continuation of application No. 15/981,504, filed on May 16, 2018, now Pat. No. 10,448,656.

(60) Provisional application No. 62/507,506, filed on May 17, 2017.

(51) Int. Cl.
  *A23G 9/28*  (2006.01)
(52) U.S. Cl.
  CPC ............. *A23G 9/281* (2013.01); *A23G 9/282* (2013.01)
(58) Field of Classification Search
  CPC ................................ A23G 9/281; A23G 9/282
  See application file for complete search history.

(56) References Cited

U.S. PATENT DOCUMENTS

| | | | |
|---|---|---|---|
| 3,661,303 A | 5/1972 | Prosenbauer | |
| 4,378,164 A | 3/1983 | Manfroni | |
| 4,881,663 A | 11/1989 | Seymour | |
| 5,962,035 A | 10/1999 | Masse et al. | |
| 6,675,990 B2 | 1/2004 | Cocchi | |
| 8,496,141 B2 | 7/2013 | McKay et al. | |
| 9,560,865 B2 | 2/2017 | Cocchi et al. | |

(Continued)

FOREIGN PATENT DOCUMENTS

| | | |
|---|---|---|
| EP | 1 466 532 A1 | 10/2004 |
| EP | 2 269 469 | 1/2011 |
| EP | 2 550 869 A1 | 1/2013 |

OTHER PUBLICATIONS

Search Report for International Application No. PCT/US2018/032969, dated Jul. 10, 2018, 17 pages.

(Continued)

*Primary Examiner* — Frederick C Nicolas
(74) *Attorney, Agent, or Firm* — Foley & Lardner LLP

(57) ABSTRACT

A frozen food product dispensing machine includes a housing, and a freezer barrel and a cover defining a food product volume configured to contain food product. The cover defines a passage fluidly coupled to the food product volume. The machine further includes a spigot disposed within the passage and translatable along a longitudinal axis between a first position and a second position, and an actuator coupled to the spigot by an actuator interface. The spigot prevents a flow of food product through the passage when in the first position and allows the flow of food product through the passage when in the second position. The actuator is configured to selectively move the spigot between the first position and the second position. The spigot is configured to be removed from the cover while the cover is coupled to the housing.

20 Claims, 28 Drawing Sheets

(56) References Cited

U.S. PATENT DOCUMENTS 10,448,656 B2 * 10/2019 Wetenkamp .......... A23G 9/282
2017/0094990 A1    4/2017 Mohammed et al.

OTHER PUBLICATIONS

Stoelting, A Vollrath Company, Model F231 Operators Manual, Jan. 1, 2016, 27 pages.

* cited by examiner

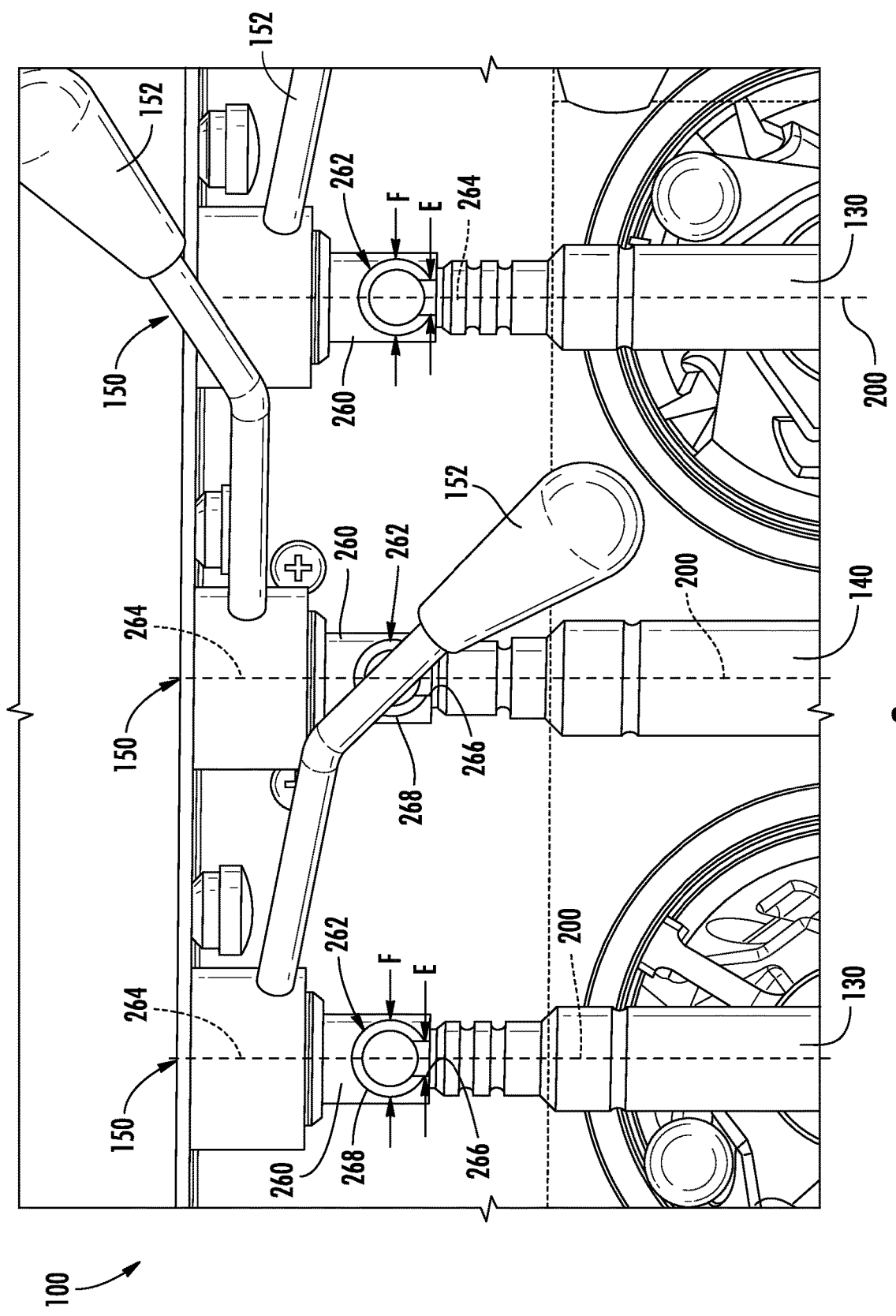

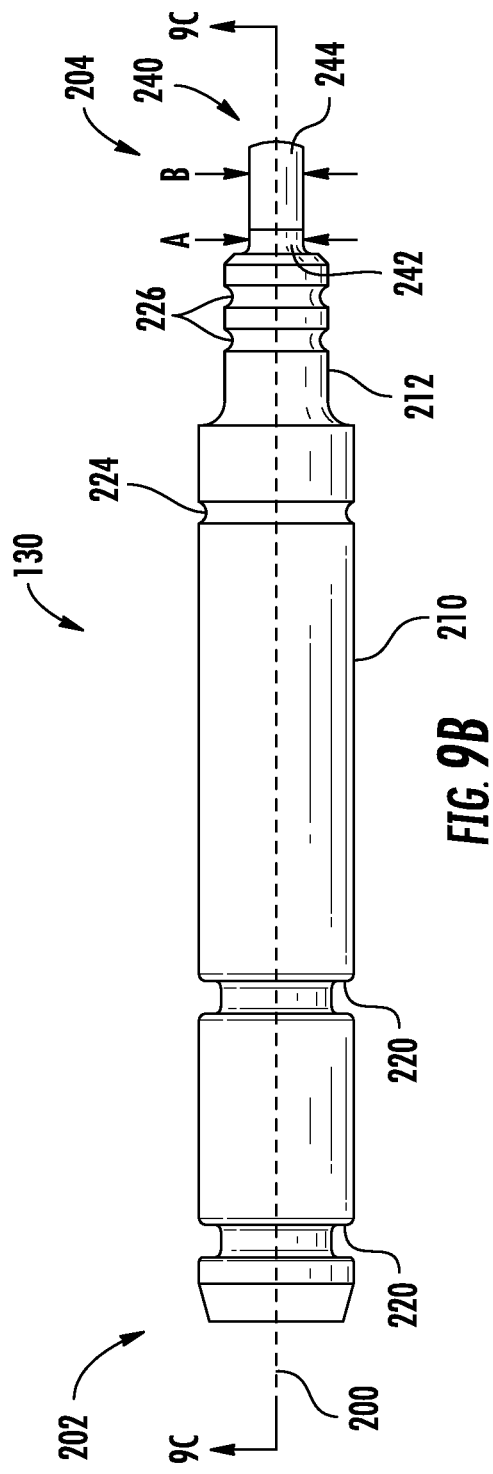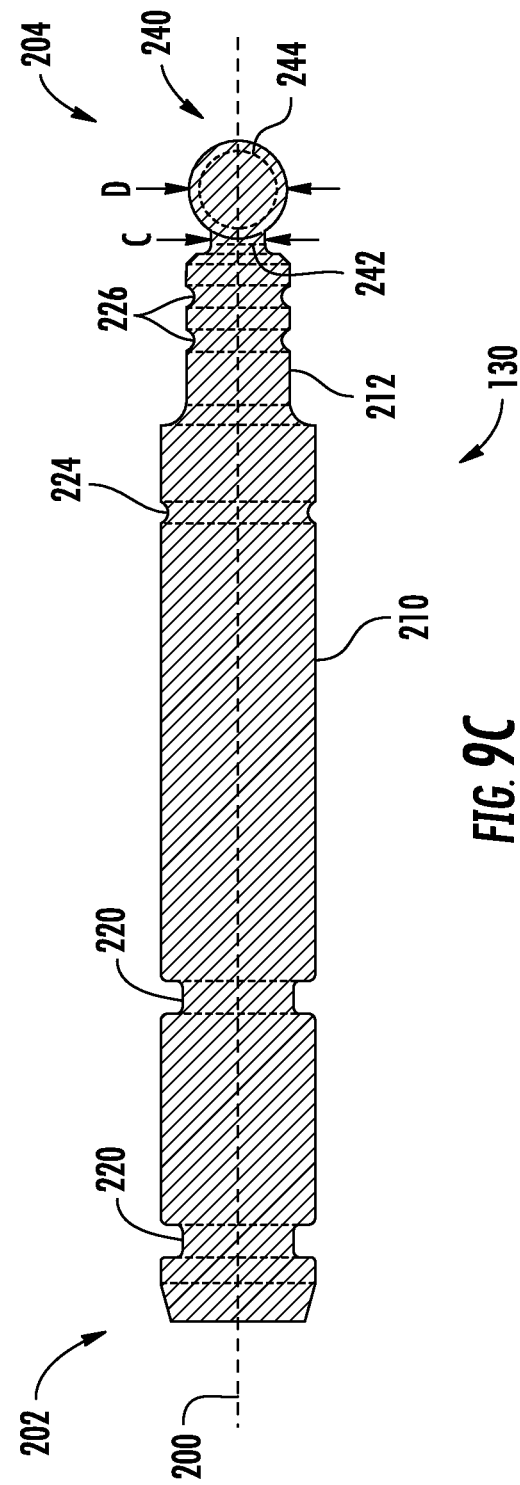

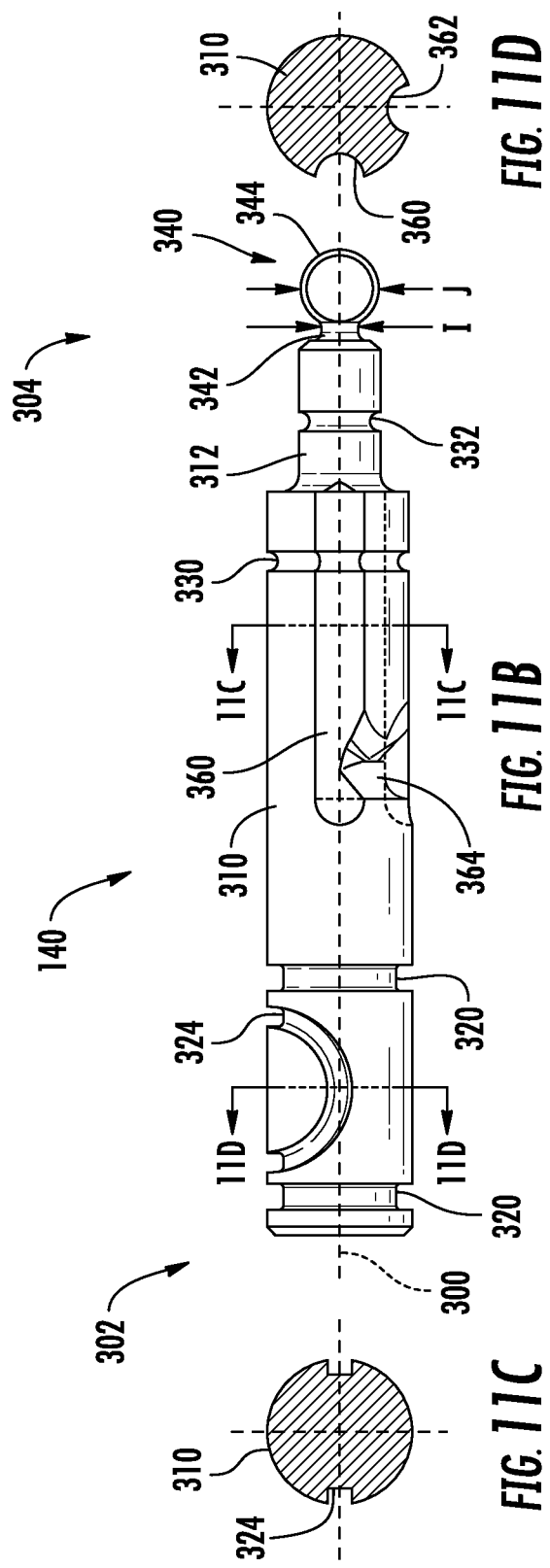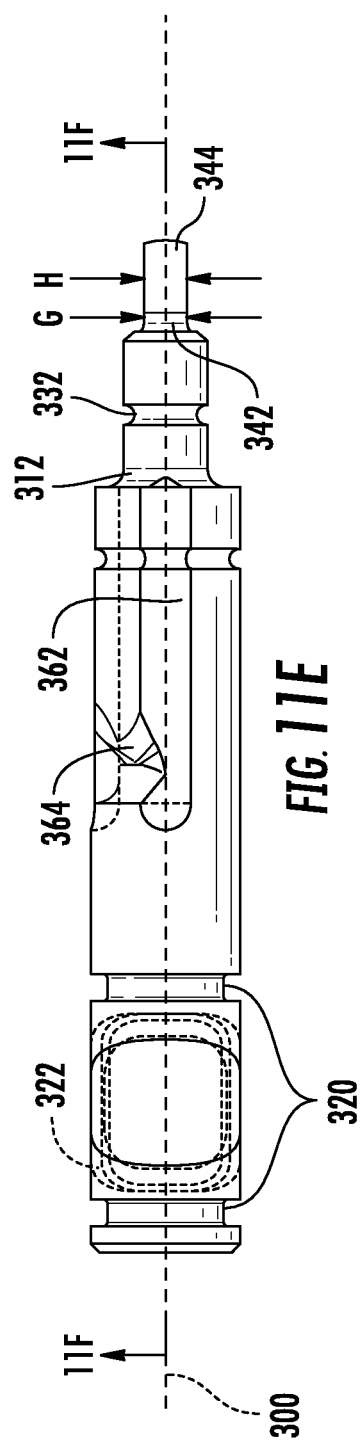

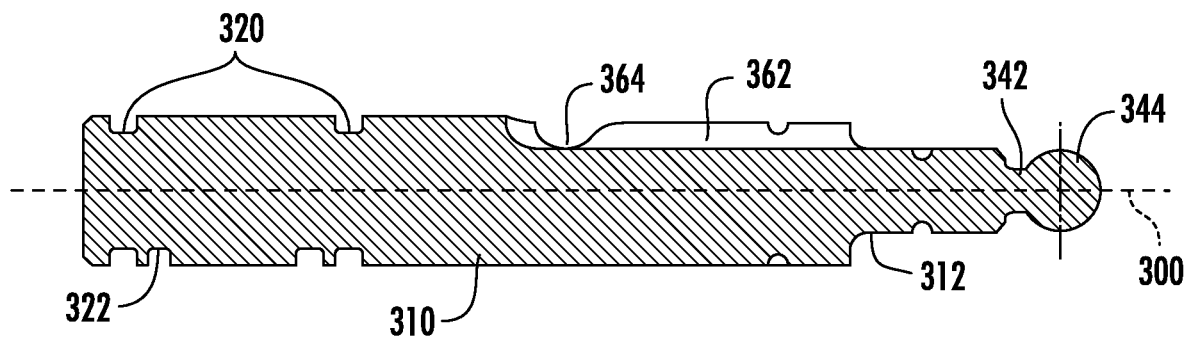
FIG. 11F
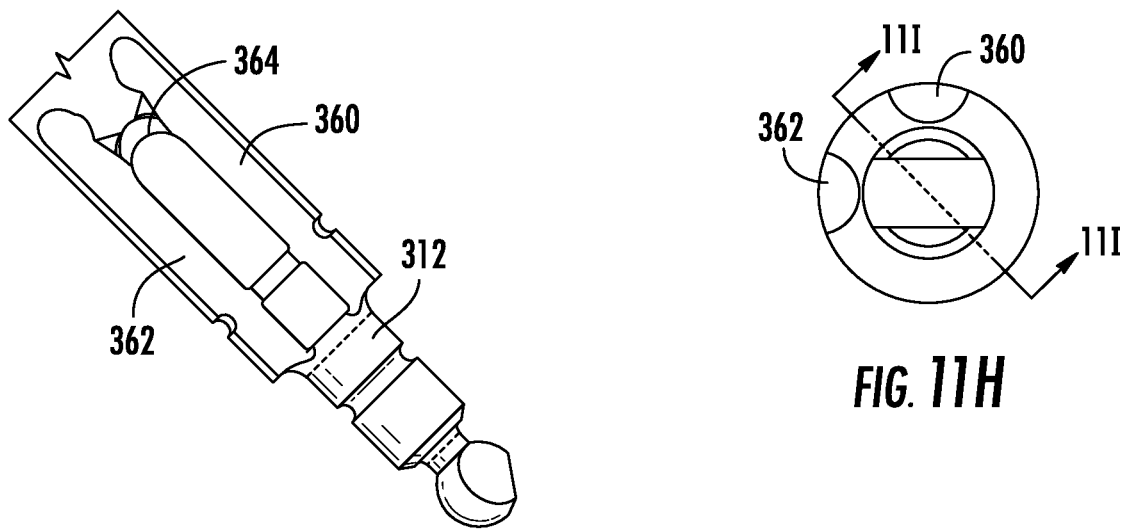
FIG. 11G
FIG. 11H
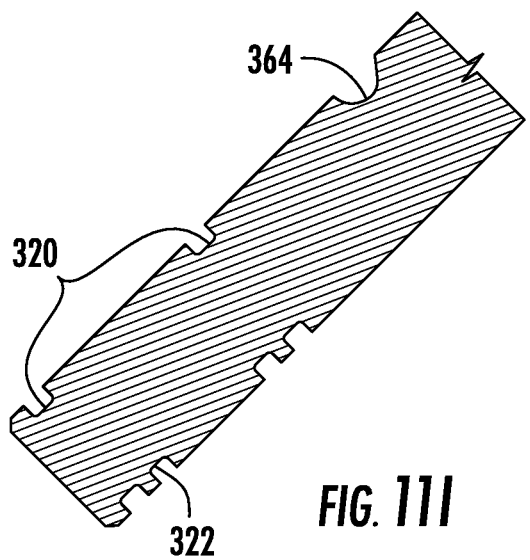
FIG. 11I

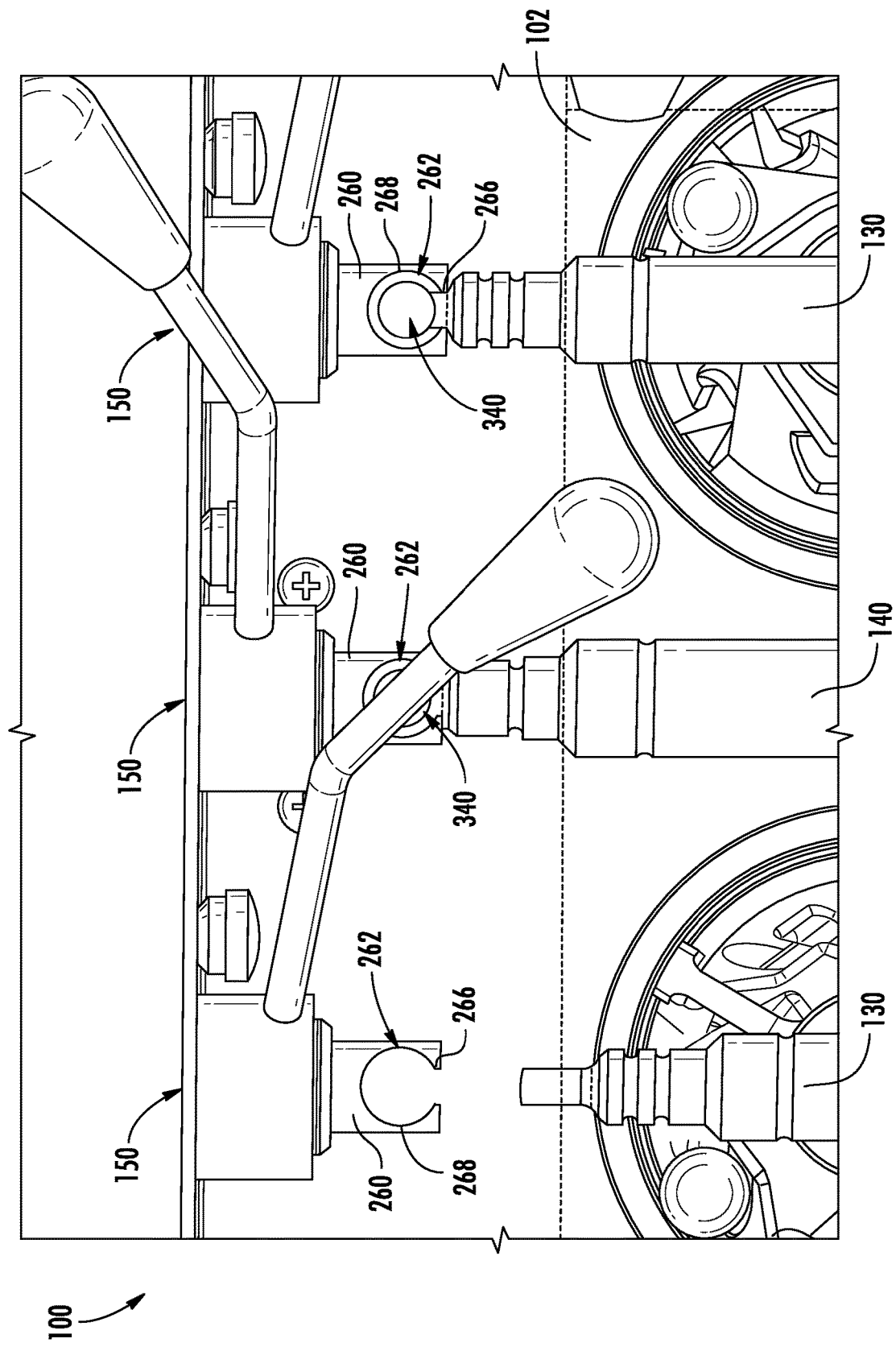

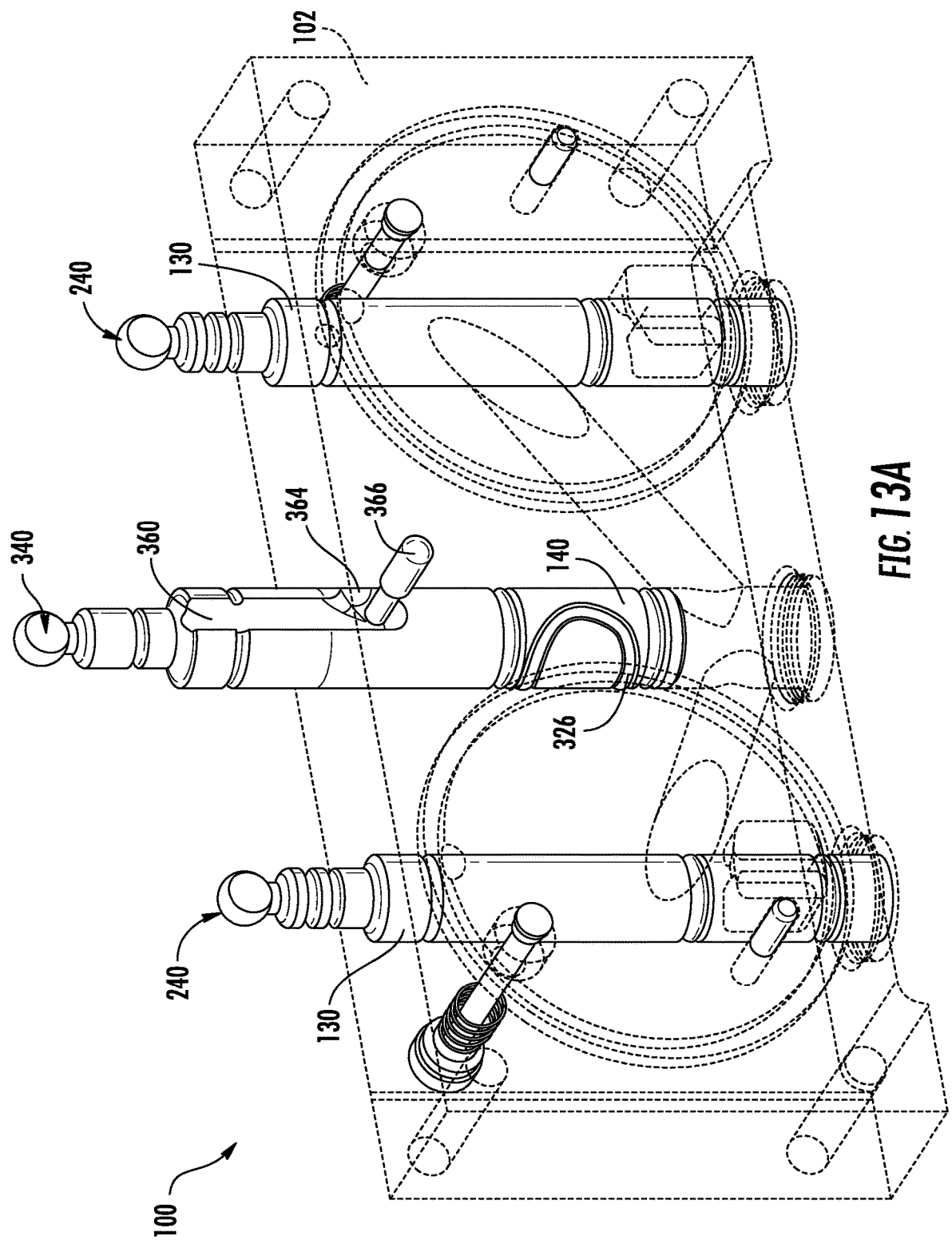

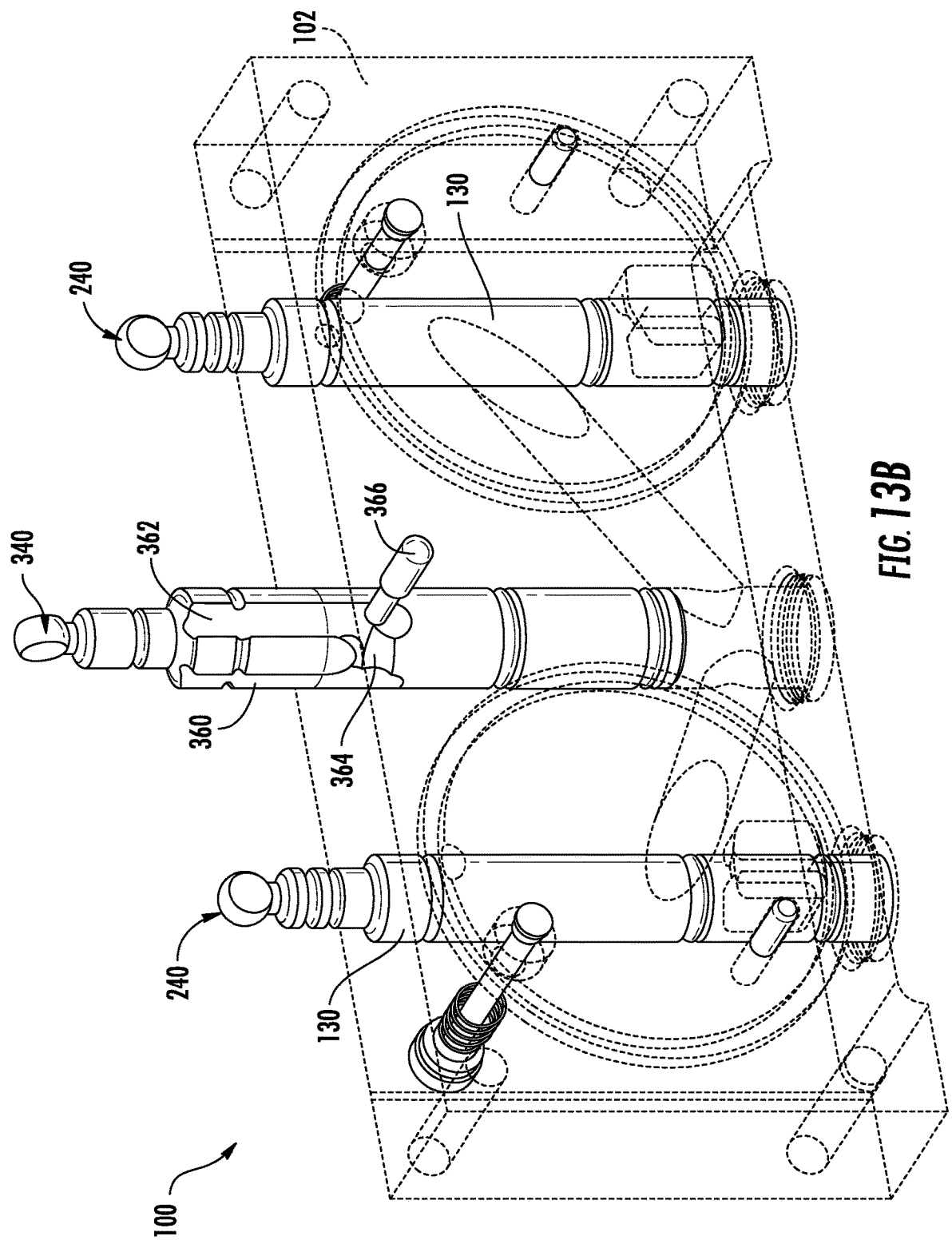

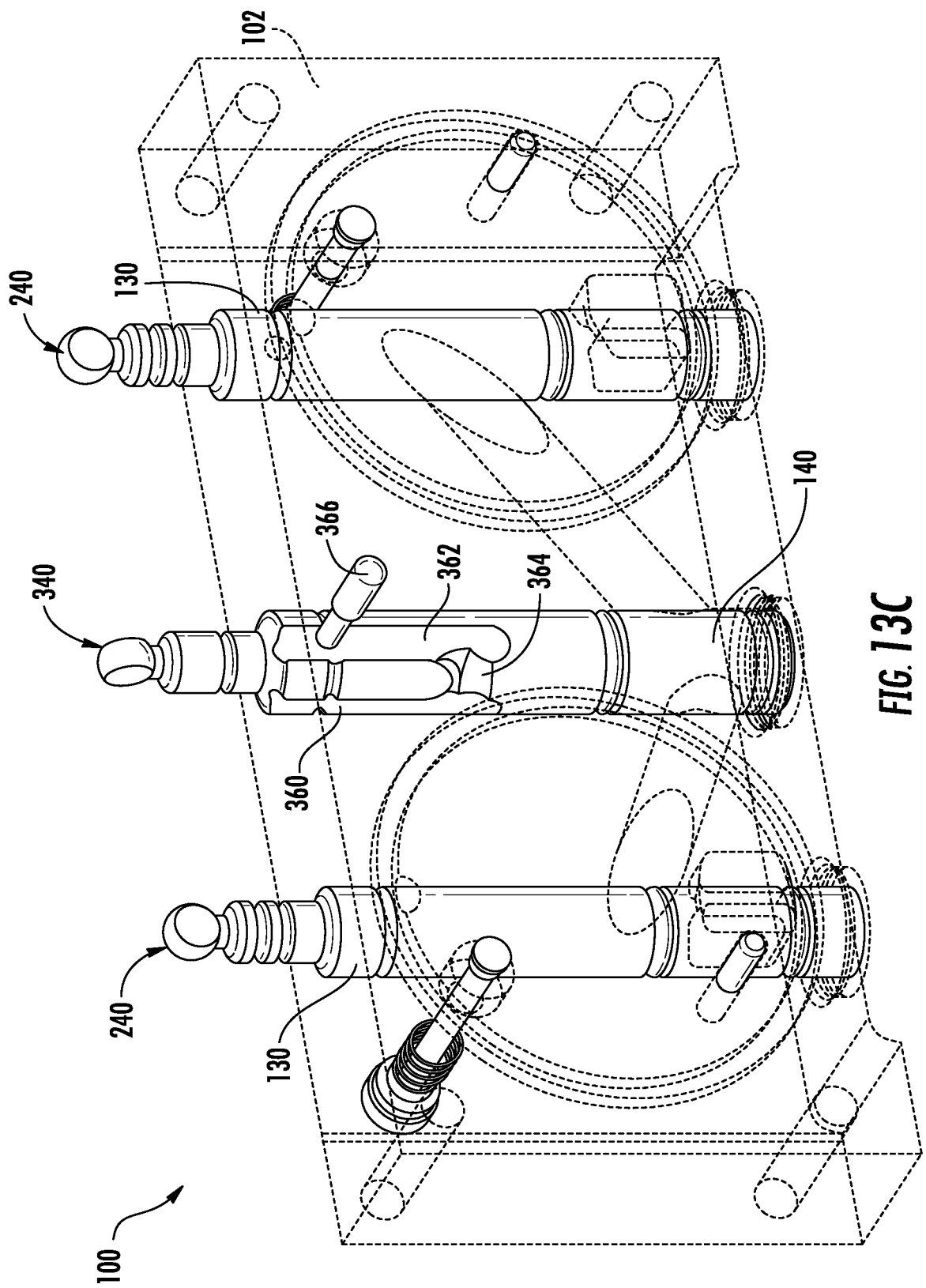

FROZEN FOOD PRODUCT DISPENSING MACHINES HAVING REMOVABLE SPIGOTS

CROSS-REFERENCE TO RELATED PATENT APPLICATIONS

This application is a continuation of U.S. application Ser. No. 15/981,504, filed May 16, 2018, which claims the benefit of and priority to U.S. Application No. 62/507,506, filed May 17, 2017, both of which are incorporated herein by reference in their entireties.

BACKGROUND

The present invention relates generally to the field of frozen food product dispensing machines.

Frozen food product dispensing machines are used to dispense soft confectionary food products such as aerated ice cream, custard, frozen yogurt, sherbets, sorbets, or other similar frozen food products. A storage hopper, bag, or other reservoir holds a liquid form of the desired food product. Air and the liquid are drawn into a freezing chamber where they are mixed and cooled to form the aerated frozen food product that is commonly referred to as a "soft-serve" frozen food product.

SUMMARY

One embodiment relates to a frozen food product dispensing machine including a housing, a freezer barrel, and a cover coupled to the housing. The freezer barrel and the cover define a food product volume configured to contain food product, and the cover defines a passage fluidly coupled to the food product volume. The machine further includes a spigot disposed within the passage and translatable along a longitudinal axis between a first position and a second position, the spigot including an actuator interface, an actuator coupled to the spigot by the actuator interface. The spigot prevents a flow of food product through the passage when in the first position and allows the flow of food product through the passage when in the second position. The actuator is configured to selectively move the spigot between the first position and the second position. The spigot is configured to be removed from the cover while the cover is coupled to the housing.

Another embodiment relates to a frozen food product dispensing machine including a housing, first and second freezer barrels, a cover coupled to the housing, first and second spigots, and first and second actuators. The first freezer barrel and the cover define a first food product volume, and the second freezer barrel and the cover define a second food product volume. The cover defines a first passage fluidly coupled to the first food product volume and a second passage fluidly coupled to the second food product volume. The first spigot is disposed within the first passage and translatable along a first axis. The second spigot is disposed within the second passage and translatable along a second axis. The first actuator is coupled to the first spigot and configured move the first spigot to control a flow of food product along the first passage. The second actuator is coupled to the second spigot and configured move the second spigot to control a flow of food product along the second passage. The first spigot is configured to be selectively decoupled from the first actuator and removed from the cover while the second spigot is coupled to the second actuator.

Another embodiment relates to a method of disassembling a frozen food product dispensing machine including providing the frozen food product dispensing machine. The machine includes a housing, a freezer barrel, a cover coupled to the housing, a spigot, and an actuator. The freezer barrel and the cover define a food product volume. The cover defines a passage fluidly coupled to the food product volume. The spigot is disposed within the passage and translatable along a longitudinal axis. The spigot includes an actuator interface. The actuator is coupled to the spigot by the actuator interface and configured move the spigot to control a flow of food product along the passage. The method further includes decoupling the actuator from the actuator interface such that the spigot can translate along the longitudinal axis independent of the actuator and moving the spigot along the passage and away from the actuator to remove the spigot from the cover. The cover is coupled to the housing both when decoupling the actuator from the actuator interface and when removing the spigot from the cover.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

FIG. 8 is a front view of the dispensing system of FIG. 7.

FIG. 9B is a top view of the side spigot of FIG. 9A.

FIG. 9C is a section view of the side spigot of FIG. 9A taken along line 9C-9C in FIG. 9B.

FIG. 11B is a right side view of the mixing spigot of FIG. 11A.

FIG. 11C is a section view of the mixing spigot of FIG. 11A taken along line 11C-11C in FIG. 11B.

FIG. 11D is a section view of the mixing spigot of FIG. 11A taken along line 11D-11D in FIG. 11B.

FIG. 11E is a bottom view of the mixing spigot of FIG. 11A.

FIG. 11F is a section view of the mixing spigot of FIG. 11A taken along line 11F-11F in FIG. 11E.

FIG. 11G is a plan view of a portion of the mixing spigot of FIG. 11A.

FIG. 11H is a front view of the mixing spigot of FIG. 11A.

FIG. 11I is a section view of a portion of the mixing spigot of FIG. 11A taken along line 11I-11I of FIG. 11H.

FIG. 12B is a front view of the dispensing system of FIG. 4 with the left side spigot rotated to the removal orientation and removed from the left side actuator.

FIG. 13A is a perspective view of a portion of the dispensing system of FIG. 4 with the mixing spigot translated upward from the normal operating position to the rotation position.

FIG. 13B is a perspective of view of the portion of the dispensing system of FIG. 13A with the mixing spigot in the rotation position and rotated to the removal orientation.

FIG. 13C is a perspective view of the portion of the dispensing system of FIG. 13A with the mixing spigot translated downward toward the removal portion and at the removal orientation.

DETAILED DESCRIPTION

Figure 1:
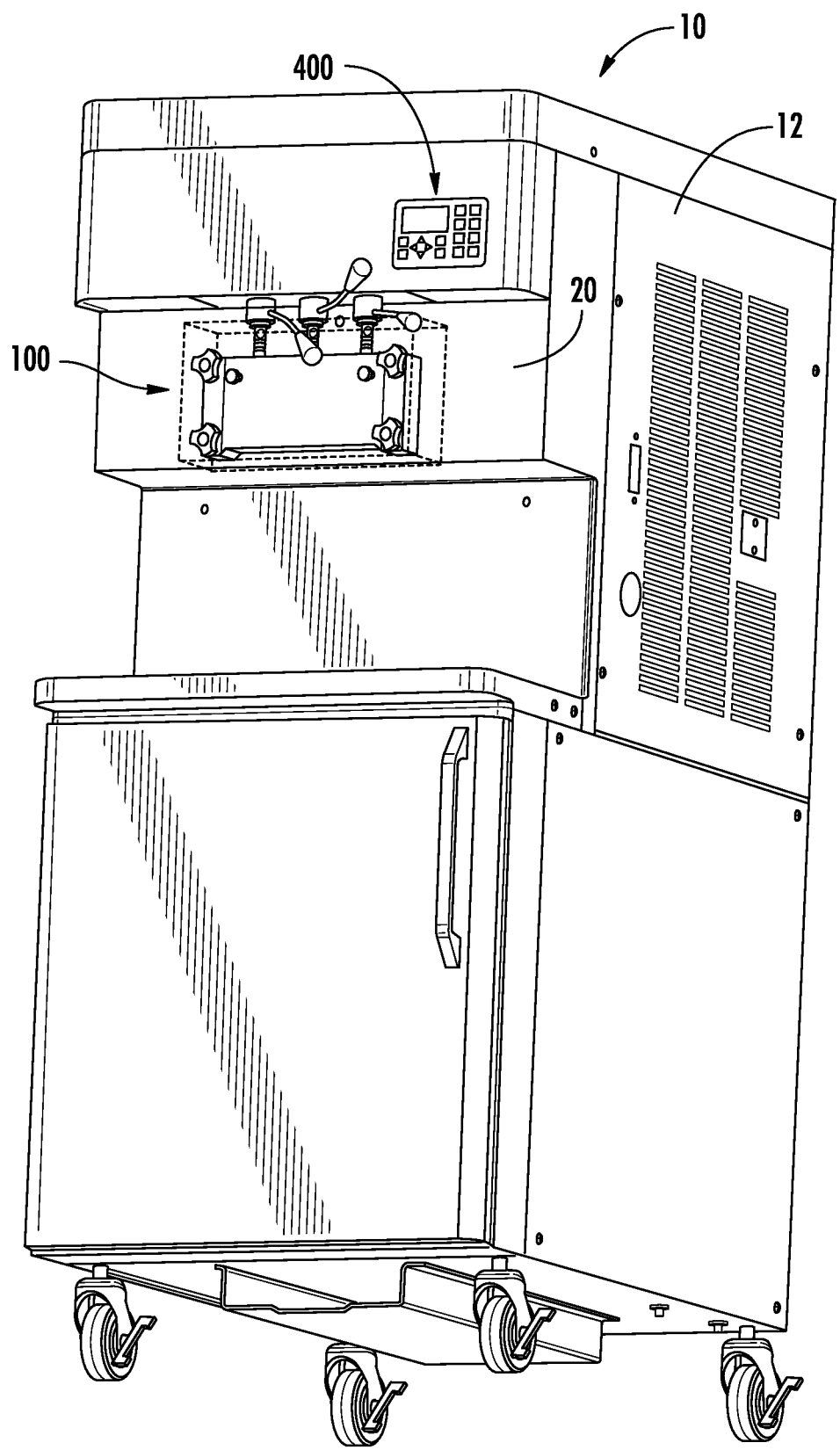
FIG. 1 is a perspective view of a frozen food product dispensing machine, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

According to an exemplary embodiment, a frozen food product dispensing machine includes a dispensing system configured to dispense frozen food product. The frozen food product dispensing machine includes a pair of freezer barrels, each with a corresponding auger assembly disposed therein. The walls of the freezer barrels are cooled such that the food product mixture freezes within the freezer barrels, and the augers move the frozen food product toward an aperture located near an end of each of the freezer barrels. The dispensing system includes a cover that extends over both of the apertures, sealing the freezer barrels. Two side spigot passages, one corresponding to each cylinder, extend vertically through the cover and are fluidly coupled to the corresponding freezer barrel. A mixing spigot passage extends vertically through the cover and is fluidly coupled to both freezer barrels. A side spigot or valve spool is disposed within each side spigot passage, and a mixing spigot or valve spool is disposed within the mixing spigot passage. The side spigots and the mixing spigots are each coupled to an actuator that moves the corresponding spigot between a sealing position, where the spigot blocks the flow of food product, and a dispensing position, where the spigot allows the flow of food product out of the dispensing machine. The spigots and the actuator have specific corresponding geometry such that the spigots may be selectively decoupled from the respective actuators by rotating the spigots to a particular rotational position. The mixing spigot defines a groove, and the cover includes a pin that extends into the groove, selectively preventing rotation of the mixing spigot relative to the cover.

According to the exemplary embodiment shown in FIGS. 1-7, a valve assembly, shown as dispensing system 100, is used with a frozen food product dispensing machine, shown as dispensing machine 10, to control flows of frozen food product from the dispensing machine 10. According to the exemplary embodiment shown in FIGS. 1-3, the dispensing machine 10 is a multi-barrel (e.g., a two-barrel, etc.) frozen food product dispensing machine configured to dispense multiple types of frozen food product (e.g., a first flavor, a second flavor, a swirl or combination flavor, etc.). In other embodiments, the dispensing machine 10 is a single-barrel frozen food product dispensing machine. The dispensing machine 10 may be any type of frozen food product dispensing machine (e.g., a frozen yogurt dispensing machine, a frozen treat dispensing machine, an ice-cream dispensing machine, a custard dispensing machine, a slushie machine, etc.) configured to dispense any type of frozen food product (e.g., yogurt, ice-cream, custard, slushie, etc.).

Figure 2:
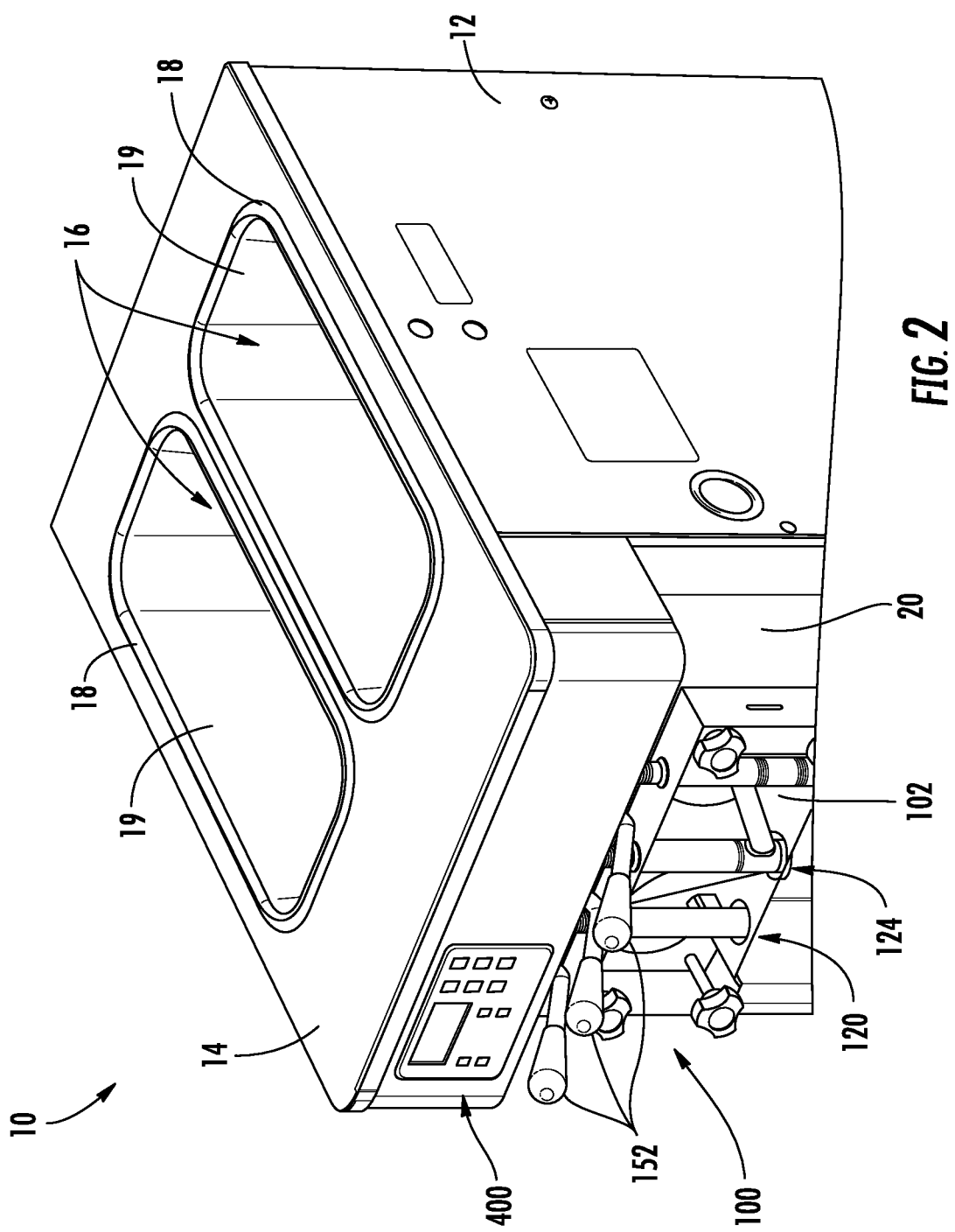
FIG. 2 is a perspective view of a portion of the frozen food product dispensing machine of FIG. 1.
Figure 3:
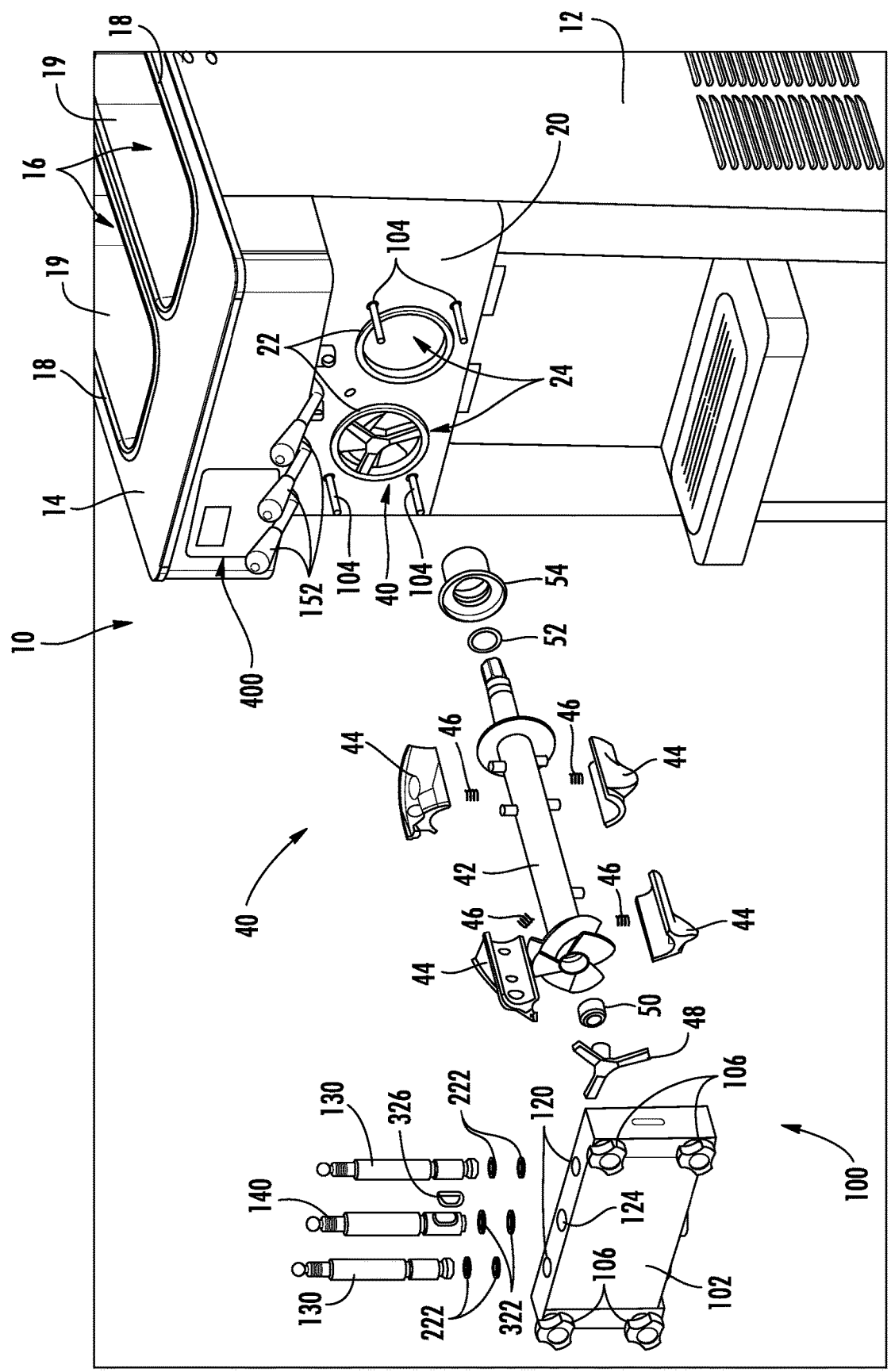
FIG. 3 is an exploded view of the frozen food product dispensing machine of FIG. 1.

As shown in FIGS. 1-3, the dispensing machine 10 further includes a user interface, shown as user interface 400. In one embodiment, the user interface 400 includes a display and an operator input. The display may be configured to display a graphical user interface, an image, an icon, or still other information. In one embodiment, the display includes a graphical user interface configured to provide general information about the dispensing machine 10 (e.g., mixture levels, mixture temperature, etc.). The graphical user interface may also be configured to display an indication that the dispensing machine 10 is due for cleaning, maintenance, and/or repair. The operator input may be used by an operator to provide commands to the dispensing machine 10 (e.g., a desired temperature of the mixture, etc.). The operator input may include one or more buttons, knobs, touchscreens, switches, levers, joysticks, pedals, and/or handles. The operator may be able to manually control some or all aspects of the operation of dispensing machine 10 using the display and the operator input.

As shown in FIGS. 2-3, the dispensing machine 10 includes a main body, shown as housing 12, a first surface, shown as top surface 14, and a second surface, shown as front surface 20. The top surface 14 defines a plurality of openings or cavities, shown as hopper cavities 16, that provide access to an interior of the housing 12 of the dispensing machine 10. According to an exemplary embodiment, the hopper cavities 16 facilitate pouring a frozen food product mixture (e.g., a frozen treat mixture, a frozen yogurt mixture, an ice-cream mixture, a frozen custard mixture, a slushie mixture, and/or another type of mixture) into the dispensing machine 10. As shown in FIGS. 1-3, the hopper cavities 16 have an inner, peripheral wall, shown as hopper wall 19, and a retaining structure, shown as lip 18, extending outward from the top surface 14 and around the hopper wall 19 of each hopper cavity 16. In other embodiments, the lip 18 is a depression defined by the top surface 14 that extends around the hopper wall 19 of each hopper cavity 16. In alternate embodiments, the lip 18 is omitted (e.g., another type of retaining structure may be included, etc.). Alternately, collapsible bags or another type of reservoir are used to hold the frozen food product mixture instead of the hoppers cavities 16.

As shown in FIG. 3, the dispensing machine 10 includes a number of cavities, shown as freezer barrels 22, that extend partway through the housing 12. An aperture, shown as opening 24, of each of the freezer barrels 22 extends through the front surface 20 such that the interior of the freezer barrels 22 can be accessed from the front of the dispensing machine 10. According to an exemplary embodiment, the number of freezer barrels 22 corresponds with the number of hopper cavities 16. As shown in FIG. 3, the dispensing machine 10 includes multiple auger assemblies 40. According to an exemplary embodiment, the number of auger assemblies 40 corresponds with the number of freezer barrels 22. As shown in FIG. 3, each freezer barrel 22 is configured to receive one of the auger assemblies 40. According to an exemplary embodiment, the auger assemblies 40 are configured to rotate within the freezer barrels 22 to mix the mixture poured into the dispensing machine 10 via the hopper cavities 16. The dispensing machine 10 includes a refrigeration system used to cool and/or freeze the mixture in the freezer barrels 22 before it is dispensed.

Figure 4:
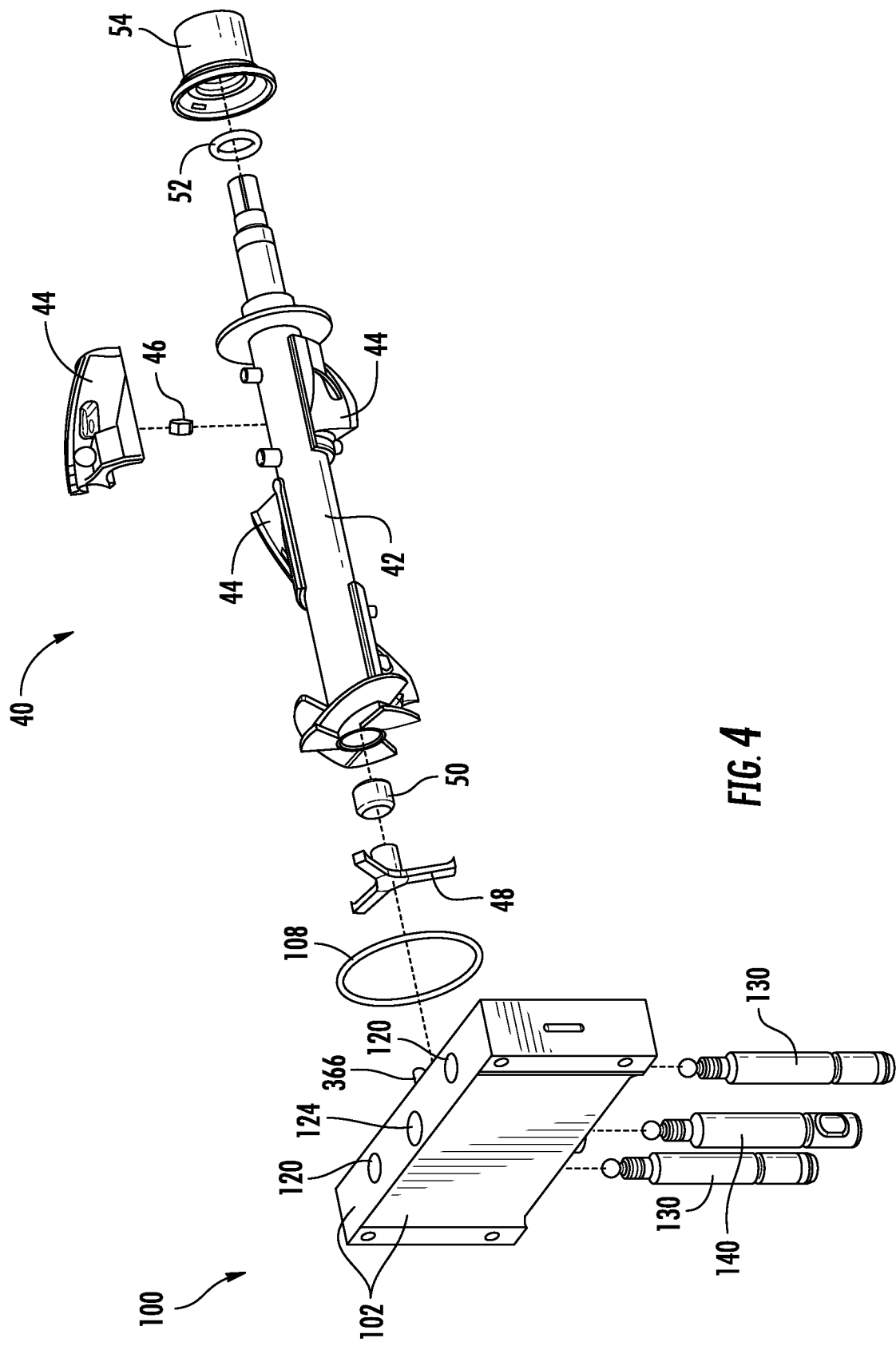
FIG. 4 is an exploded view of a dispensing system of the frozen food product dispensing machine of FIG. 1.
Figure 5:
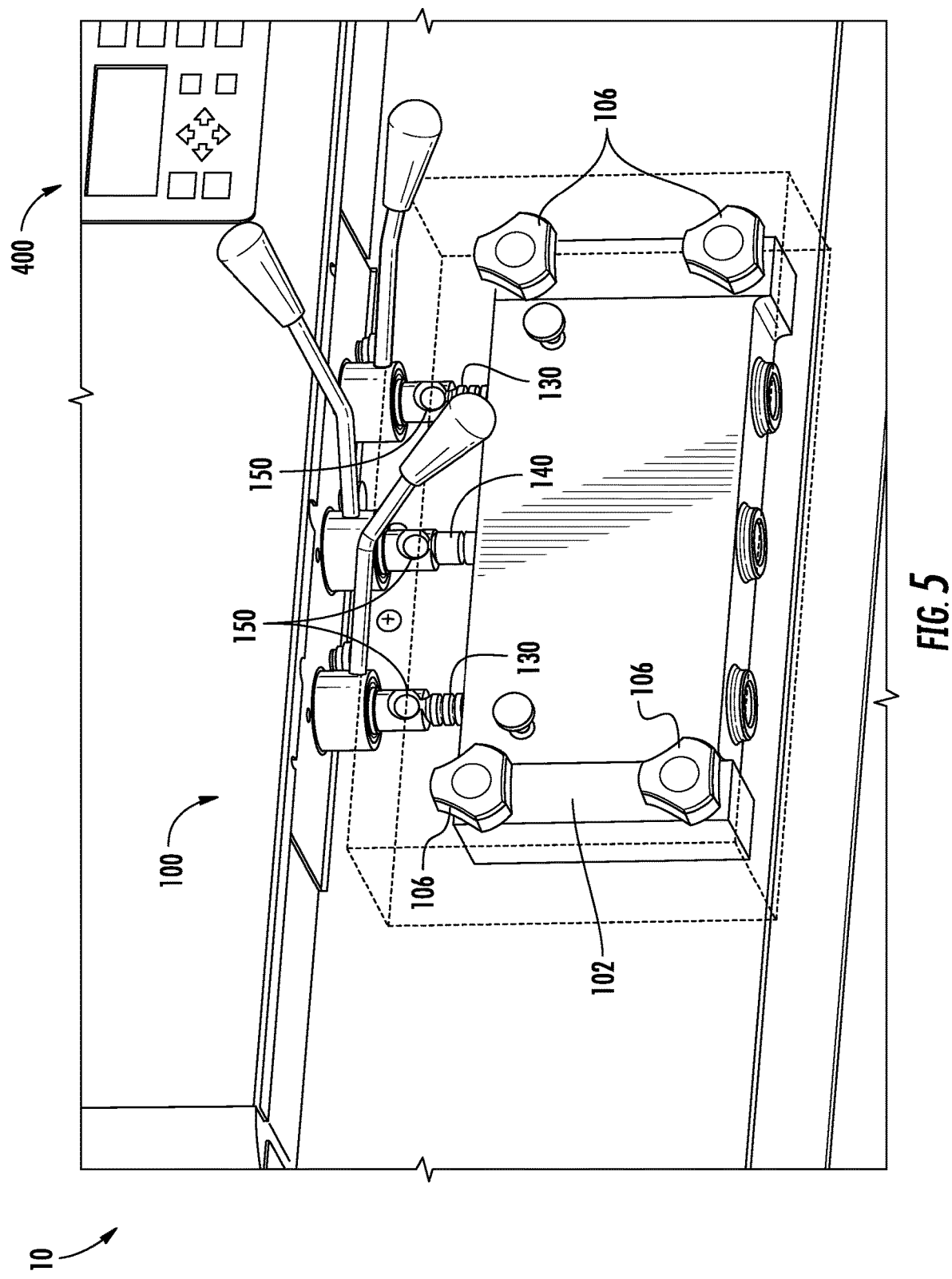
FIG. 5 is a perspective view of the dispensing system of FIG. 4.
Figure 6:
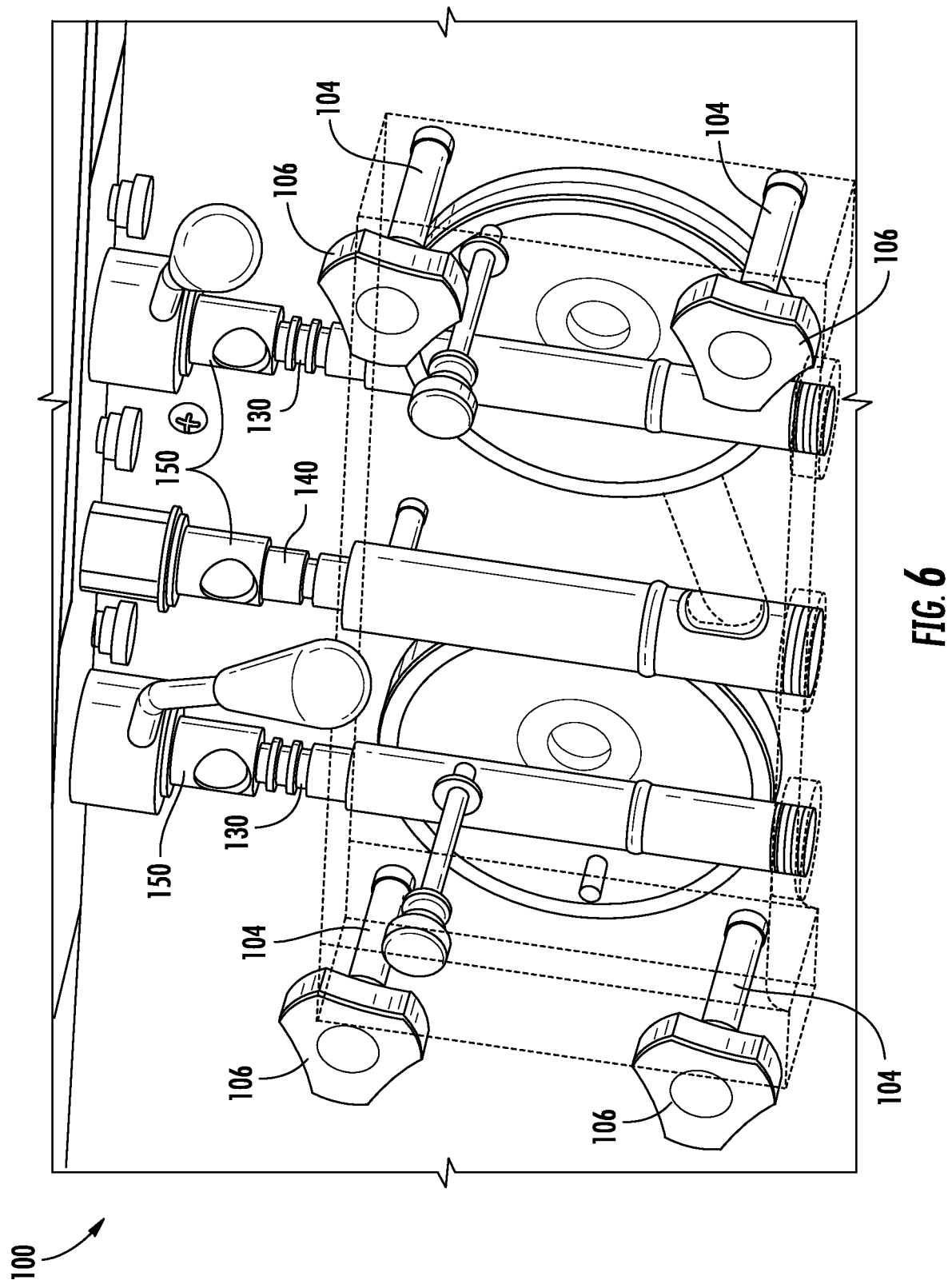
FIG. 6 is another perspective view of the dispensing system of FIG. 4.

As shown in FIGS. 3 and 4, the auger assemblies 40 include a plurality of components or parts including a shaft, shown as auger shaft 42; scrapers, shown as flights 44; resilient members, shown as springs 46; a support, shown as front support 48; a bushing, shown as front bushing 50; an O-ring, shown as auger O-ring 52; and a seal, shown as rear seal 54. The flights 44 are configured to couple to the auger shaft 42 and scrape the peripheral wall of the respective freezer barrel 22. The springs 46 are configured to keep pressure between the flights 44 and the peripheral wall of the freezer barrel 22 to aid in the scraping of the peripheral wall. The front bushing 50 is configured to couple the front support 48 to the auger shaft 42, and the front support 48 is configured to center the auger shaft 42 and the components attached thereto within the freezer barrel 22. The auger O-ring 52 and the rear seal 54 press against the back of the freezer barrel 22 to seal the auger assembly 40 within freezer barrel 22.

As shown in FIGS. 3-6, the dispensing machine 10 includes a dispensing system, shown as dispensing system 100. According to an exemplary embodiment, the dispensing system 100 facilitates a user (e.g., customer, worker, etc.) dispensing frozen food product from the dispensing machine 10. A shown in FIGS. 3-6, the dispensing system 100 includes a cover, shown as front door 102. The front door 102 extends laterally, defining a width, vertically, defining a height, and longitudinally, defining a thickness of the front door 102. According to an exemplary embodiment, the front door 102 is selectively attached (e.g., coupled, fastened, etc.) to the front surface 20 of the dispensing machine 10. A series of fasteners, shown as studs 104, extend from the front surface 20 of the dispensing machine 10 and through corresponding apertures defined in the front door 102. Corresponding threaded fasteners, shown as knobs 106, are threaded onto the studs 104, pressing the front door 102 against the front surface 20. The front door 102 extends laterally and vertically parallel to the front surface 20, extending across the openings 24 of both of the freezer barrels 22. A resilient member, shown as O-ring 108, lies in a groove, shown in FIG. 7 as O-ring groove 110, surrounding the opening 24 of each of the freezer barrels 22. The O-ring 108 extends between the front surface 20 and the front door 102. A first food product volume is defined between one of the freezer barrels 22 and the front door 102. A second food product volume is defined between the other freezer barrel 22 and the front door 102. Tightening of the knobs 106 compresses the O-rings 108, preventing food product from leaking between the freezer barrels 22 and the front door 102.

Figure 7:
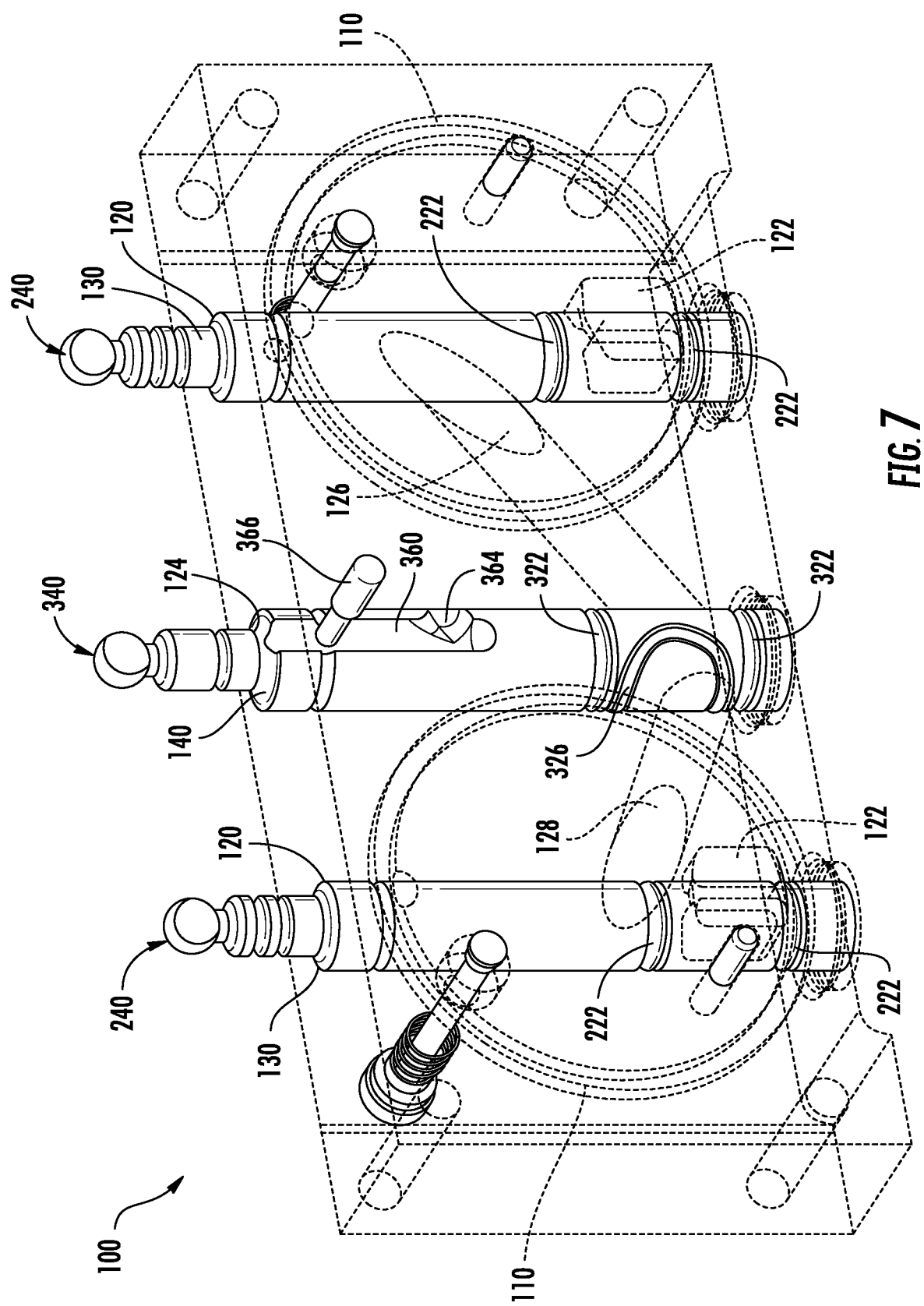
FIG. 7 is a perspective view of the dispensing system of FIG. 4, including an alternative embodiment of a pair of side spigots and an alternative embodiment of a mixing spigot.

Referring to FIG. 7, a pair of apertures, shown as side valve passages 120, extend vertically through the front door 102. Each of the side valve passages 120 extend across the opening 24 of one of the freezer barrels 22. The side valve passages 120 are fluidly coupled to the corresponding food product volume by an aperture, shown as feeding passage 122. The front door 102 is configured such that food product in the first food product volume can flow out of the dispensing machine 10 through the feeding passage 122 and the side valve passage 120 corresponding with the first food product volume. The front door 102 is configured such that food product in the second food product volume can flow out of the dispensing machine 10 through the feeding passage 122 and the side valve passage 120 corresponding with the second food product volume. A third aperture, shown as mixing valve passage 124, extends vertically through the front door 102. The mixing valve passage 124 is located between the side valve passages 120 and extends vertically through the front door 102. A first aperture, shown as feeding passage 126, extends between the first food product volume and the mixing valve passage 124. A second aperture, shown as feeding passage 128, extends between the second food product volume and the mixing valve passage 124. In some embodiments, the feeding passage 126 and the feeding passage 128 meet the mixing valve passage at the same vertical position. The front door 102 is configured such that food product in the first food product volume and food product in the second food product volume can flow into the mixing valve passage 124 through the feeding passage 126 and the feeding passage 128, respectively, to mix the frozen food products from both food product volumes (i.e., as a swirled combination of frozen food products). The food product from the first food product volume and the second food product volume mix in the mixing valve passage 124, and the mixed food product is discharged from the dispensing machine 10 through the mixing valve passage 124.

A spigot, shown as side spigot 130, is located within each of the side valve passages 120. The side spigots 130 are vertically translatable relative to the front door 102 between a sealing position and a dispensing position. In the sealing position, shown in FIG. 7, the side spigots 130 are disposed between the feeding passages 122 and the side valve passages 120, preventing the flow of food product out of the dispensing machine 10. In the dispensing position, the side spigots 130 are moved upwards relative to the sealing position, such that food product can flow through the feeding passages 122 and out of the dispensing machine 10 through the bottom of the side valve passage 120. A mixing spigot 140 is located within the mixing valve passage 124. The mixing spigot 140 is vertically translatable relative to the front door 102 between a sealing position and a dispensing position. In the sealing position, shown in FIG. 7, the mixing spigot 140 is disposed between the feeding passage 126, the feeding passage 128, and the mixing valve passage 124, preventing the flow of food product out of the dispensing machine 10. In the dispensing position, the mixing spigot 140 is moved upward relative to the sealing position, such that food product can flow through the feeding passage 126 and the feeding passage 128 and out of the dispensing machine 10 through the bottom of the mixing valve passage 124. The food product that flows out of the mixing valve passage 124 is a mixture of the food product from the first food product volume and the second food product volume (e.g., a combination or swirl, etc.).

Referring to FIG. 8, the side spigots 130 and the mixing spigot 140 are each received by an actuator 150. The dispensing system 100 includes a left side spigot 130 and a corresponding left side actuator 150, a mixing spigot 140 and corresponding center actuator 150, and a right side spigot 130 and a corresponding right side actuator 150. The actuators 150 are configured to translate vertically, moving the side spigots 130 and the mixing spigot 140 between their respective sealing and dispensing positions. As shown in FIG. 8, the dispensing system 100 includes user interface devices, shown as dispensing handles 152, that allow a user to translate the actuators 150 (e.g., through manual actuation of the dispensing handles 152, etc.), dispensing product from the dispensing machine 10. In the embodiment shown in FIG. 8, rotation of the dispensing handles 152 causes a vertical translation of the actuators 150. In other embodiments, translation of the actuators 150 is otherwise controlled by other user interface devices (e.g., with pushbuttons, automatically activated based on sensing a cup, bowl, or cone positioned beneath the dispensing system 30, etc.). The dispensing machine 10 may include a component that facilitates translation of the actuator 150 (e.g., a motor, a pneumatic cylinder, a solenoid, etc.). The actuator 150 may be biased (e.g., by a biasing member such as a spring) in a particular direction (e.g., upwards).

Figure 9A:
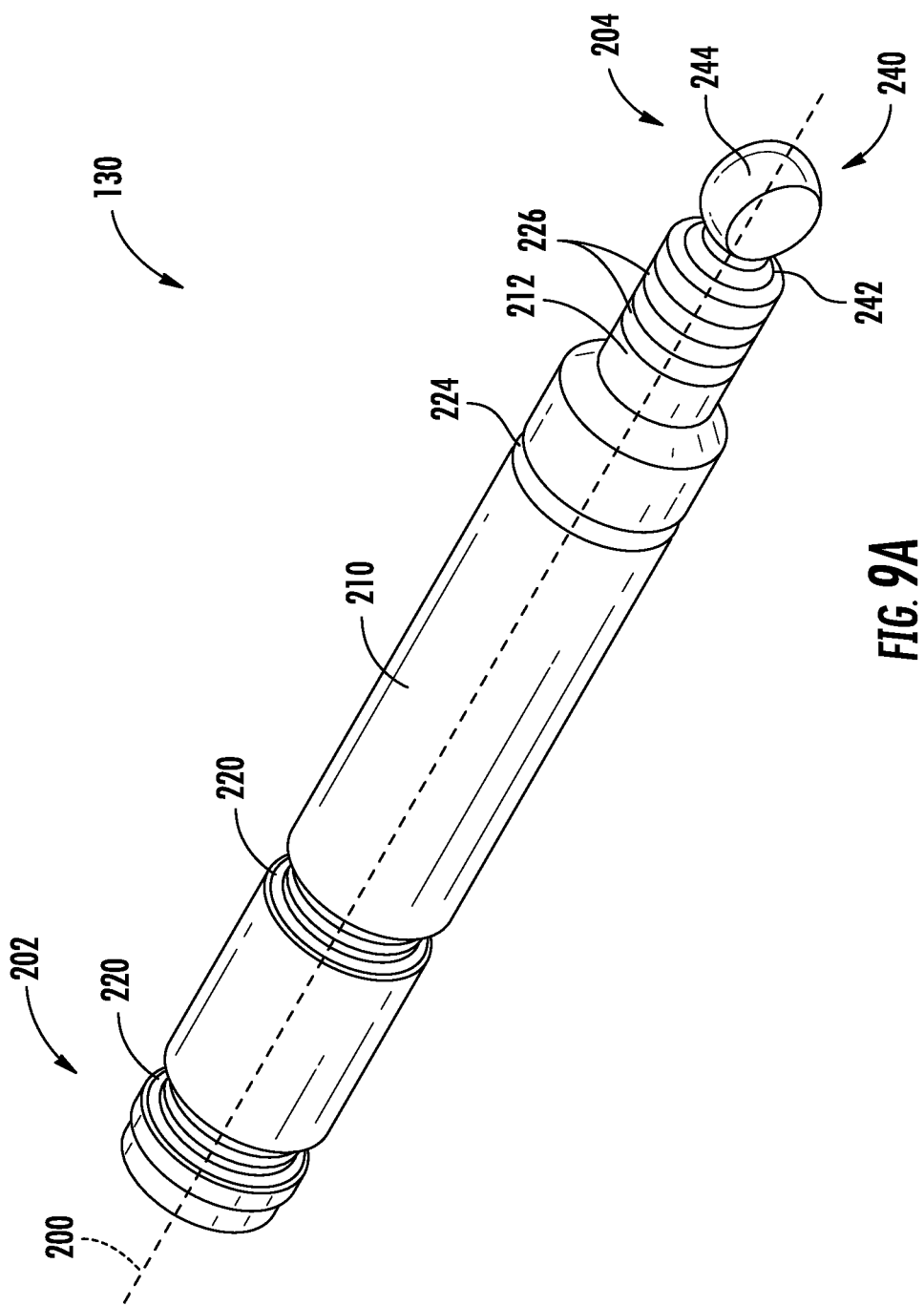
FIG. 9A is a perspective view of the side spigot of FIG. 7.

Referring to FIGS. 9A-9C, the side spigot 130 is shown according to an exemplary embodiment. The side spigot 130 extends along a longitudinal axis 200 from a discharge end 202 to an actuator end 204. The cross section of the side spigot 130 perpendicular to the longitudinal axis 200 is primarily circular over the length of the side spigot 130 with variations in diameter. The side spigot 130 includes a main body 210 and a neck portion 212. The main body 210 is a larger diameter than the neck portion 212. The main body 210 is located proximate the discharge end 202, and the neck portion 212 is located proximate the actuator end 204. Near the discharge end 202, the diameter of the main body 210 decreases. Two grooves, shown as O-ring grooves 220, are defined in the main body 210 proximate the discharge end 202. As shown in FIG. 7, the O-ring grooves 220 each receive a resilient member, shown as O-ring 222. The O-ring grooves 220 are spaced such that an O-ring 222 is located on either side of the feeding passage 122 when the side spigot 130 is in the sealing position. The O-rings 222 seal against the inner wall of the side valve passage 120, preventing the flow of food product upwards or downwards through the side valve passage 120. When the side spigot 130 is moved upwards to the discharge position, the O-ring 222 located closest to the discharge end 202 moves above the feeding passage 122, facilitating the flow of food product out of the bottom of the side valve passage 120. The side spigot 130 further defines a groove 224 located in the main body 210 and a pair of grooves 226 located in the neck portion 212. The groove 224 and the grooves 226 extend around the circumference of the side spigot 130.

At the actuator end 204, the side spigot 130 includes an interface, shown as actuator interface 240. The actuator interface 240 includes a first portion, shown as neck 242, and a second portion, shown as key 244. The neck 242 couples the key 244 to the neck portion 212. The main body 210, the neck portion 212, the neck 242, and the key 244 form a continuous member. As shown in FIGS. 9B and 9C, the neck 242 has a first neck width A and the key 244 has a minor key width B measured in a first plane. The neck 242 has a second neck width C and the key 244 has a second key width D measured in a second plane rotationally offset from the first plane about the longitudinal axis 200 by an offset angle. As shown in FIGS. 9B and 9C, the neck width A and the minor key width B are measured offset 90 degrees from the neck width C and the major key width D. In other embodiments, the offset angle is a different angle (e.g., 15 degrees, 30 degrees, 45 degrees, etc.). As shown in FIGS. 9A-9C, the neck 242 has a circular cross section such that the neck widths A and C are the same. The major key width D is greater than the widths, A, B, and C.

Figure 10:
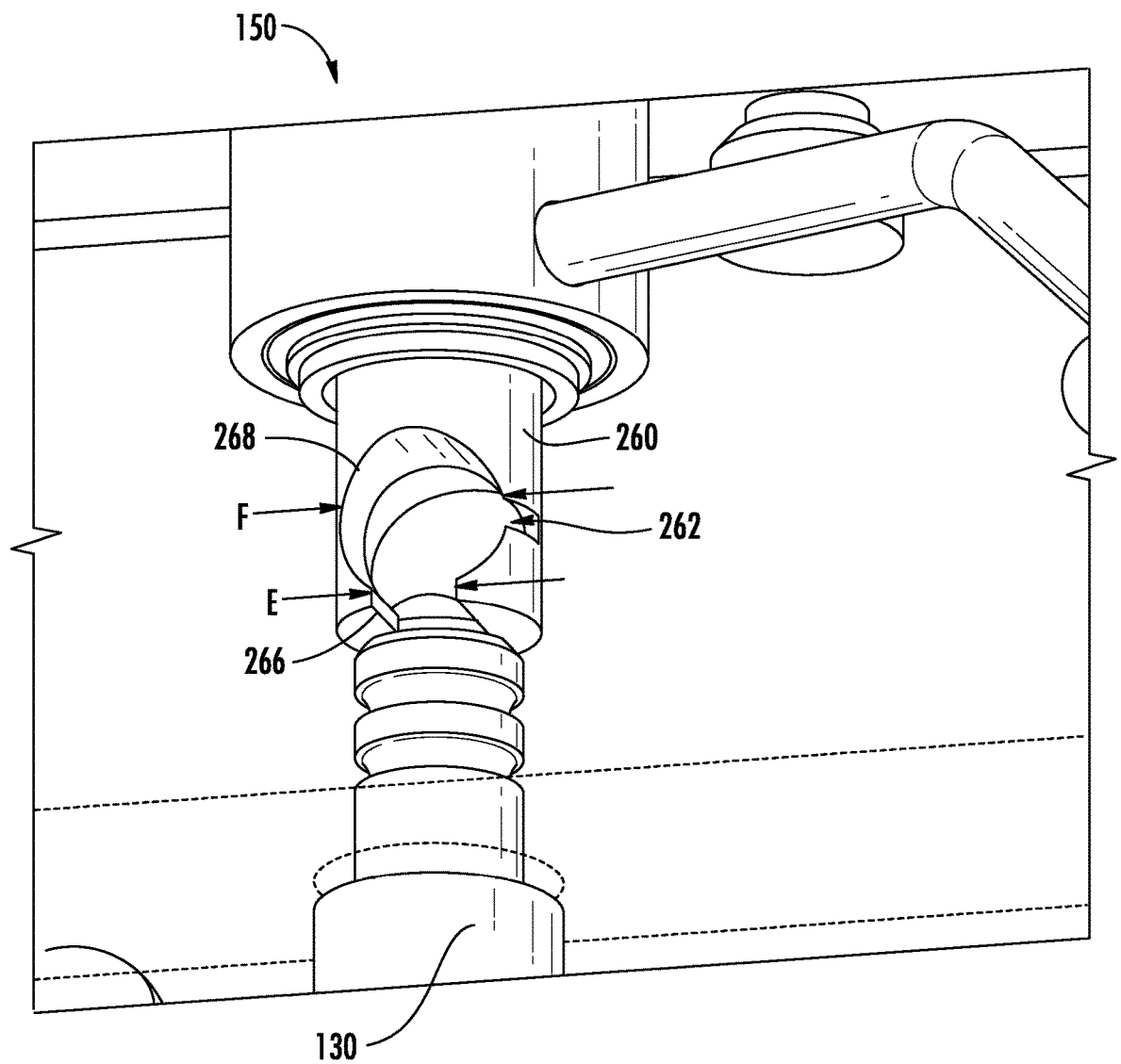
FIG. 10 is a perspective view of an actuator of the dispensing system of FIG. 4.

Referring to FIGS. 8 and 10, the actuator 150 is shown to have a body 260 defining a cutout 262. The body 260 extends along a longitudinal axis 264. When assembled, the longitudinal axis 264 is parallel to the longitudinal axis 200 of the side spigot 130. The cutout 262 extends through a bottom surface (i.e., an exterior surface) of the body 260 and includes a slot 266 and a chamber, shown as circular chamber 268. The circular chamber 268 extends though the body 260, and the slot 266 extends between the bottom surface of the body 260 and the circular chamber 268. In some embodiments, the cutout 262 extends through one or more side faces of the body 260. The slot 266 has a slot width E, and the circular chamber 268 has a chamber width F, both measured in the same plane perpendicular to the longitudinal axis 264. The chamber width F is greater than or equal to the major key width D. The slot width E is less than the major key width D and the chamber width F and greater than the neck width A and the minor key width B.

When assembling the side spigot 130 into the actuator 150, the side spigot 130 is aligned such that the minor key width B is aligned with the slot width E. The actuator interface 240 may then slide into the body 260 through the slot 266 without interference between the neck 242, the key 244, and the body 260. The side spigot 130 may then be rotated such that the neck width C and the major key width D align with the slot width E and the chamber width F, respectively. In this orientation, the side spigot 130 and the actuator 150 are coupled such that relative vertical movement between the body 260 and the side spigot 130 is prevented due to interference between the key 244 of the actuator interface 240 and the body 260. As shown in FIGS. 9A-9C, the key 244 is partially spherical with a pair of parallel flat portions cut into the key 244 (i.e., the key 244 has a frustospherical shape). The major key width D is measured along the diameter of the sphere, and the minor key width B is measured between the two flat portions. The circular chamber 268 is circular and slightly larger in diameter than the spherical portion of the key 244 (i.e., is larger than the major key width D). This facilitates rotation of the key 244 within the cutout 262 and facilitates alignment of the body 260 with the side spigot 130 when vertical force is applied to the side spigot 130 by the actuator 150. In some embodiments, the circular chamber 268 and the key 244 are otherwise shaped (e.g., rectangular, conical, cylindrical, triangular, etc.).

Referring to FIGS. 11A-11I, the mixing spigot 140 is shown according to an exemplary embodiment. The mixing spigot 140 extends along a longitudinal axis 300 from a discharge end 302 to an actuator end 304. The cross section of the mixing spigot 140 perpendicular to the longitudinal axis 300 is primarily circular over the length of the mixing spigot 140 with variations in diameter. The mixing spigot 140 includes a main body 310 and a neck portion 312. The main body 310 is a larger diameter than the neck portion 312. The main body 310 is located proximate the discharge end 302, and the neck portion 312 is located proximate the actuator end 304. Near the discharge end 302, the diameter of the main body 310 decreases. Two grooves, shown as O-ring grooves 320, are defined in the main body 310 proximate the discharge end 302. The O-ring grooves 320 extend around the circumference of the main body 310. As shown in FIG. 7, the O-ring grooves 320 each receive a resilient member, shown as O-ring 322. A groove, shown as O-ring groove 324, is defined in the main body 310 between the O-ring grooves 320. Instead of extending around the entire circumference of the main body 310 similar to the O-ring grooves 320, the O-ring groove 324 extends around only a portion of the circumference of the main body 310, doubling back to form a continuous loop. The O-ring groove 324 receives a resilient member, shown as O-ring 326.

Referring to FIG. 7, the O-ring grooves 320 are spaced such that an O-ring 322 is located on either side of the feeding passage 126 and the feeding passage 128 when the mixing spigot 140 is in the sealing position. The O-rings 322 seal against the inner wall of the mixing valve passage 124, preventing the flow of food product upwards or downwards through the mixing valve passage 124. Additionally, the O-ring 326 seals against the inner wall of the mixing valve passage 124 and surrounds the outlet of the feeding passage 128, preventing food product from one feeding passage entering the other feeding passage. When the mixing spigot 140 is moved to the discharge position, the O-ring 322 located closest to the discharge end 302 and the O-ring 326 move above the feeding passage 126 and the feeding passage 128, facilitating the mixing of food product and the flow of the mixed food product out of the bottom of the mixing valve passage 124. The mixing spigot 140 further defines a groove 330 located in the main body 310 and a groove 332 located in the neck portion 312. The groove 330 and the groove 332 extend around the circumference of the mixing spigot 140.

At the actuator end 304, the mixing spigot 140 includes an interface, shown as actuator interface 340. The actuator interface 340 may be substantially similar to the actuator interface 240. The actuator interface 340 includes a first portion, shown as neck 342 and a second portion, shown as key 344. The neck 342 couples the key 344 to the neck portion 312. As shown in FIGS. 11B and 11E, the neck 342 has a first neck width G and the key 344 has a minor key width H, both measured in a first plane. The neck 342 has a second neck width I and the key 344 has a major key width J measured in a second plane rotationally offset from the first plane about the longitudinal axis 300 by an offset angle. As shown in FIGS. 11B and 11E, the neck width G and the minor key width H are measured offset 90 degrees from the neck width I and the major key width J. In other embodiments, the offset angle is a different angle (e.g., 15 degrees, 30 degrees, 45 degrees, etc.). As shown, the neck 342 has a circular cross section such that the neck widths G and I are the same. The major key width J is greater than the widths, G, H, and I. In some embodiments, the widths G, H, I, and J are substantially similar to the widths A, B, C, and D, respectively, facilitating the use of a similar actuator 150 with each of the side spigots 130 and the mixing spigot 140. The actuator interface 340 and the body 260 of the actuator 150 have a similar interlocking relationship to the actuator interface 240 and the body 260 of the actuator 150.

Figure 11A:
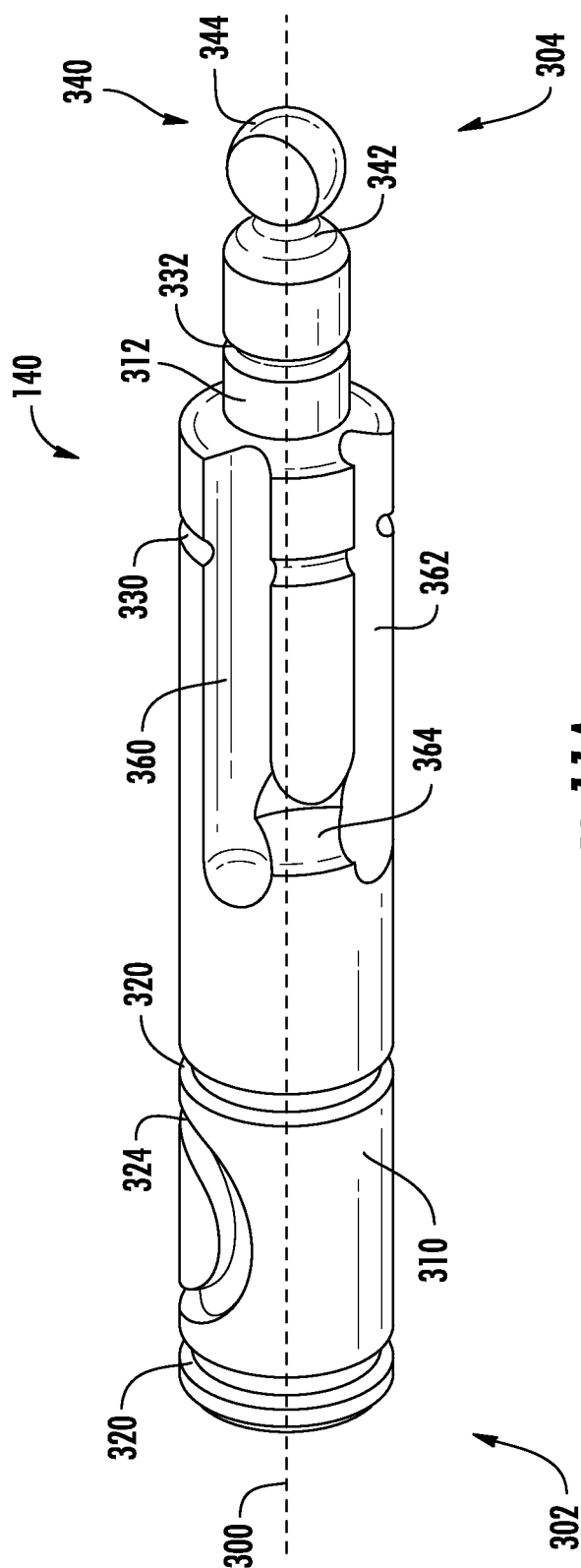
FIG. 11A is a perspective view of the mixing spigot of FIG. 9A.

Due to the radial asymmetry of the O-ring groove 324, in normal operation, the mixing spigot 140 is rotationally fixed relative to the front door 102. Without the proper radial alignment, the O-ring 326 would not seal the feeding passage 126 from the feeding passage 128, and food product from the first food product volume could move up into the second food product volume or vice versa. This is undesirable in applications where different types of food product (e.g., different flavors) are stored in each food product volume. Referring to FIG. 11A, a first groove, shown as operation groove 360, extends longitudinally along a portion of the length of the main body 310. The operation groove 360 may extend through the end of the main body 310 closest to the actuator end 304. A second groove, shown as removal groove 362, extends longitudinally along a portion of the main body 310. The removal groove 362 extends through the end of the main body 310 closest to the actuator end 304. The operation groove 360 and the removal groove 362 are angularly offset from one another about the longitudinal axis 300 (e.g., 60 degrees, 90 degrees, 120 degrees, etc.). A third groove, shown as connecting groove 364, extends between the operation groove 360 and the removal groove 362. A pin 366 extends through the front door 102 and into the mixing valve passage 124 such that the pin 366 can extend into the operation groove 360, the removal groove 362, and the connecting groove 364 with the mixing spigot 140 in the mixing valve passage 124.

In normal operation, the pin 366 rides in the operation groove 360, preventing rotation of the mixing spigot 140 and moving up and down in the connecting groove 160 as the mixing spigot 140 translates vertically. The operation groove 360 is oriented relative to the actuator interface 340 such that the actuator interface 340 is held in the body 260 of the actuator 150 while the pin 366 is in the operation groove 360. The pin 366 may selectively move into the connecting groove 364 and the removal groove 362, allowing rotation of the mixing spigot 140. To remove the mixing spigot 140, the mixing spigot 140 is moved such that the pin 366 passes through the connecting groove 364 and out through the removal groove 362. The mixing spigot 140 is moved such that the pin 366 aligns with the connecting groove 364. The removal groove 362 is oriented relative to the actuator interface 340 such that the actuator interface 340 is free to slide out of the body 260 of the actuator 150 while the pin 366 is in the removal groove 362.

The dispensing system 100 is routinely disassembled and reassembled for cleaning purposes. The arrangement of the actuator interface 340 facilitates quick removal and replacement of the spigots individually, facilitating disassembly and reassembly of the dispensing system 100. Conventional spigots cannot be removed individually. Rather, the front door and the spigots are conventionally removed and replaced as an assembly. Aligning all of the spigots to be received by actuators simultaneously can prove difficult, hindering the assembly process.

Figure 12A:
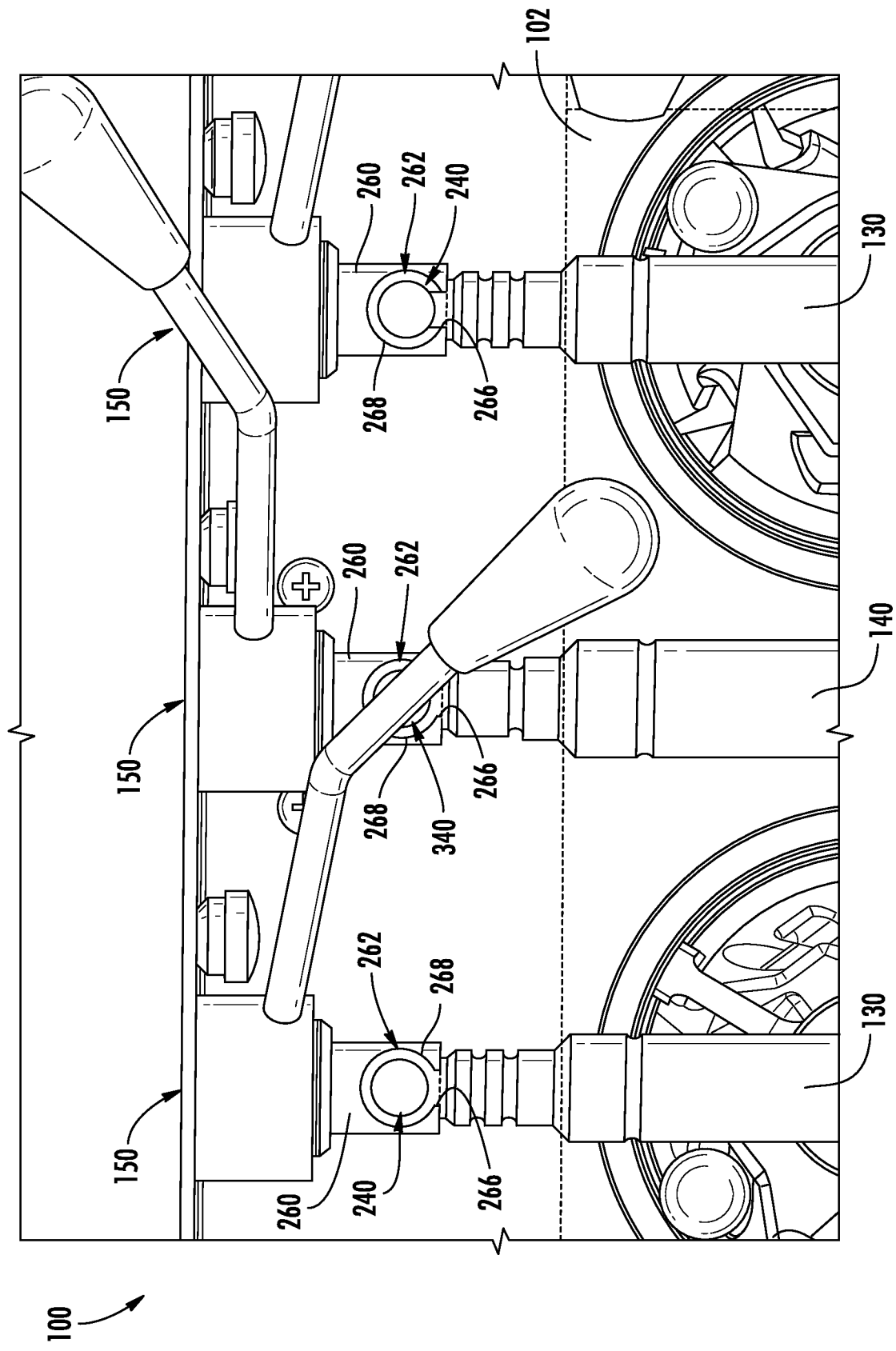
FIG. 12A is a front view of the dispensing system of FIG. 4 with the three spigots in the normal operating position.
Figure 12C:
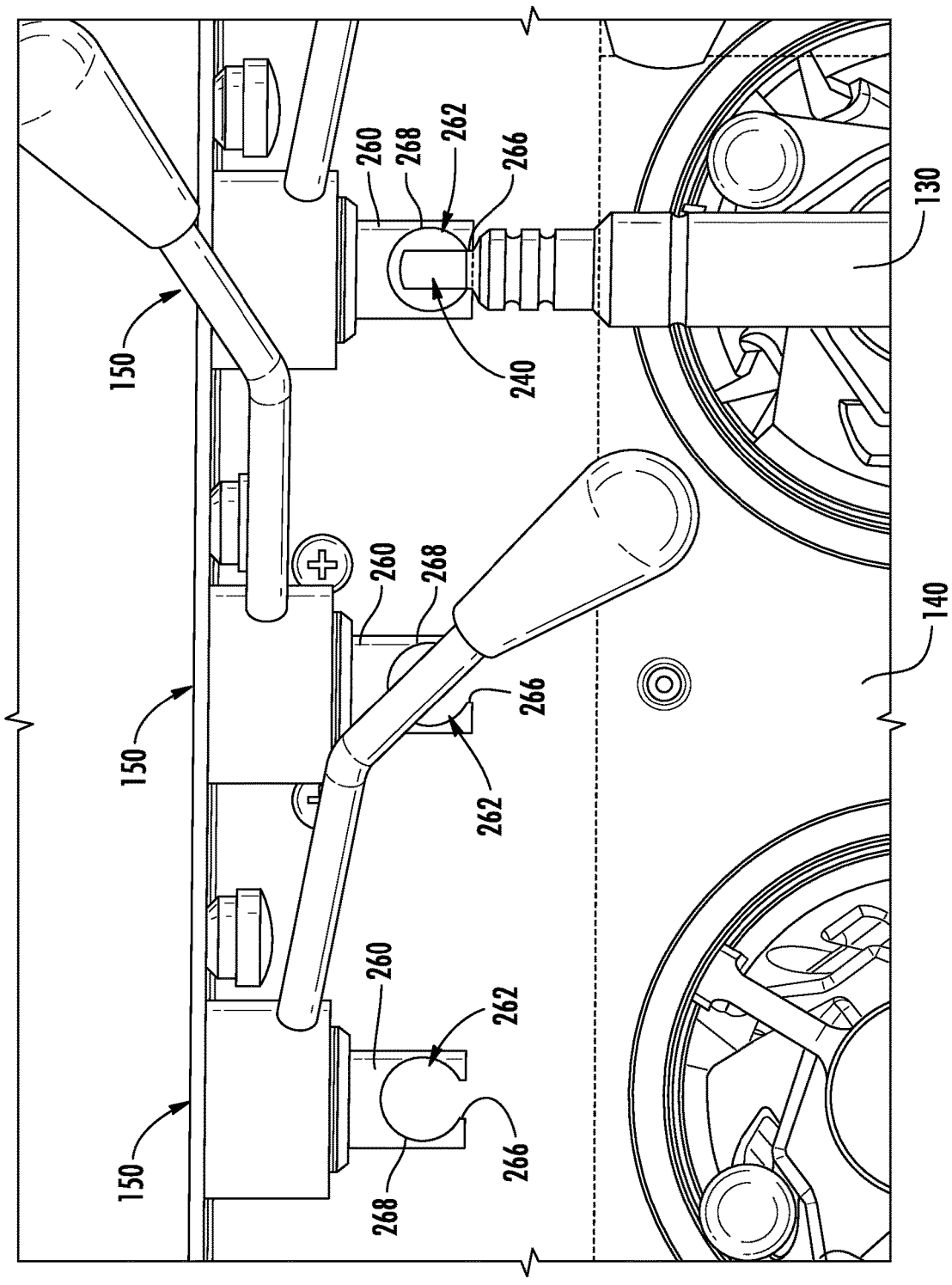
FIG. 12C is a front view of the dispensing system of FIG. 4 with the left side spigot removed from the left side actuator, the mixing spigot removed from the center actuator, and the right side spigot rotated to the removal orientation.
Figure 12D:
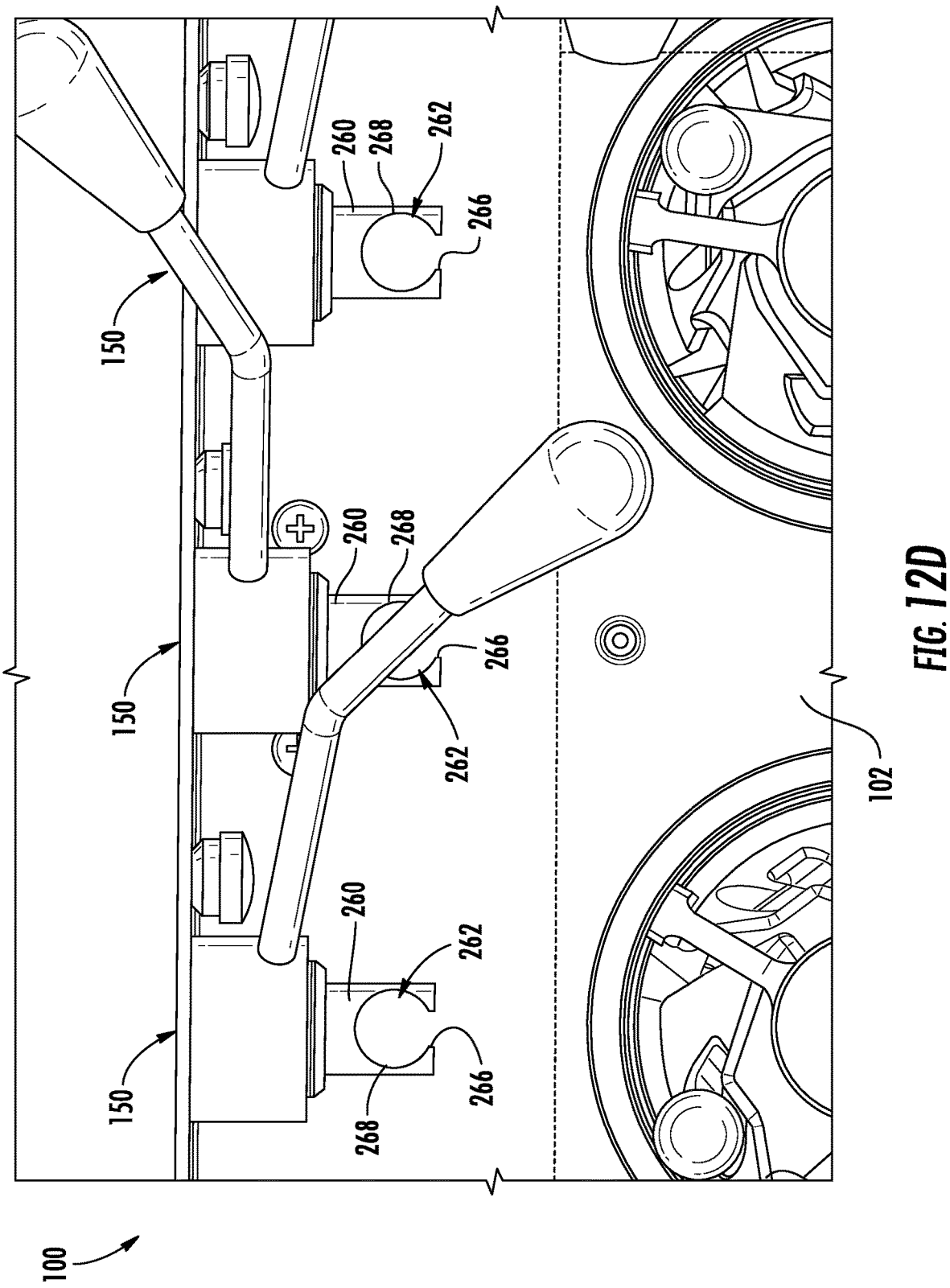
FIG. 12D is a front view of the dispensing system of FIG. 4 with the left side spigot removed from the left side actuator, the mixing spigot removed from the center actuator, and the right side spigot removed from the right side actuator.

Referring to FIGS. 12A-12D, the process of removing the side spigots 130 from the front door 102 is shown. As shown in FIG. 12A, the left side spigot 130 is secured in the cutout 262 of the left side actuator 150, which locates the left side spigot 130 in its normal operating position, and the right side spigot 130 is secure din the cutout 262 of the right side actuator 150, which locates the right side spigot 130 in its normal operating position. As shown in FIG. 12B, the left side spigot 130 is rotated to a removal orientation such that the portion of the key 244 of the actuator interface 240 having the smallest width (i.e., the minor key width B, the distance between the flat portions of the key 244) is aligned with the narrowest portion of the cutout 262 (i.e., the slot 266 having the slot width E). The side spigot 130 may be rotated by applying a torque to the neck portion 212 of the side spigot 130 (e.g., by hand, with a tool such as a wrench or a pair of pliers, etc.). The side spigot 130 may then be pushed and/or pulled out of the bottom of the side valve passage 120 and removed from the right side actuator 150. As shown in FIGS. 12C-12D, the same process may be repeated with the right side spigot 130. As shown in FIG. 12, the right side spigot 130 is in the removal orientation with the actuator interface 240 positioned within the cutout 262 of the right side actuator 150. The removal process may be performed in reverse order to assemble a side spigot 130 into an actuator 150.

Figure 13D:
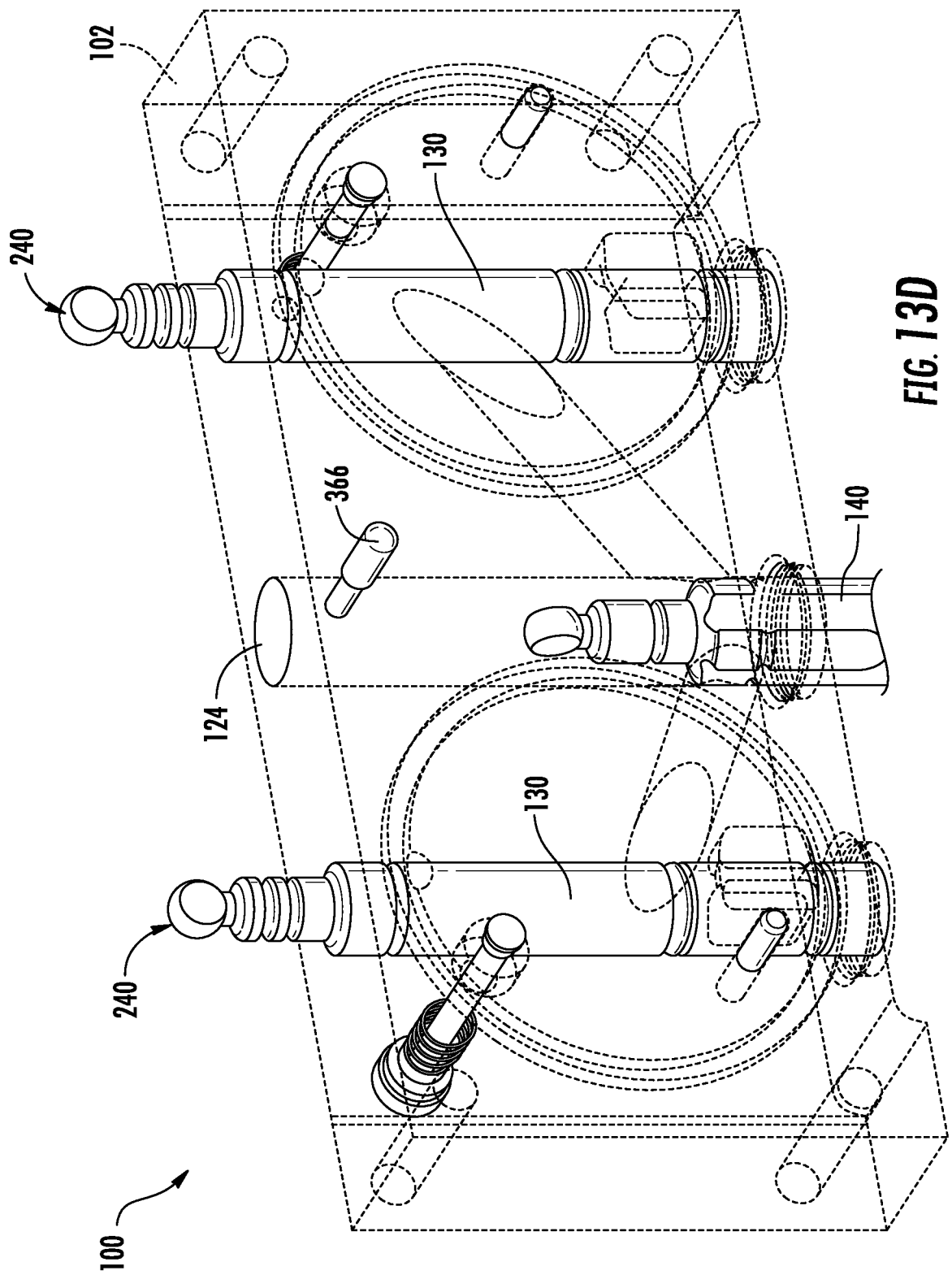
FIG. 13D is a perspective view of the portion of the dispensing system of FIG. 13A with the mixing spigot translated further downward toward the removal portion and at the removal orientation.
Figure 13E:
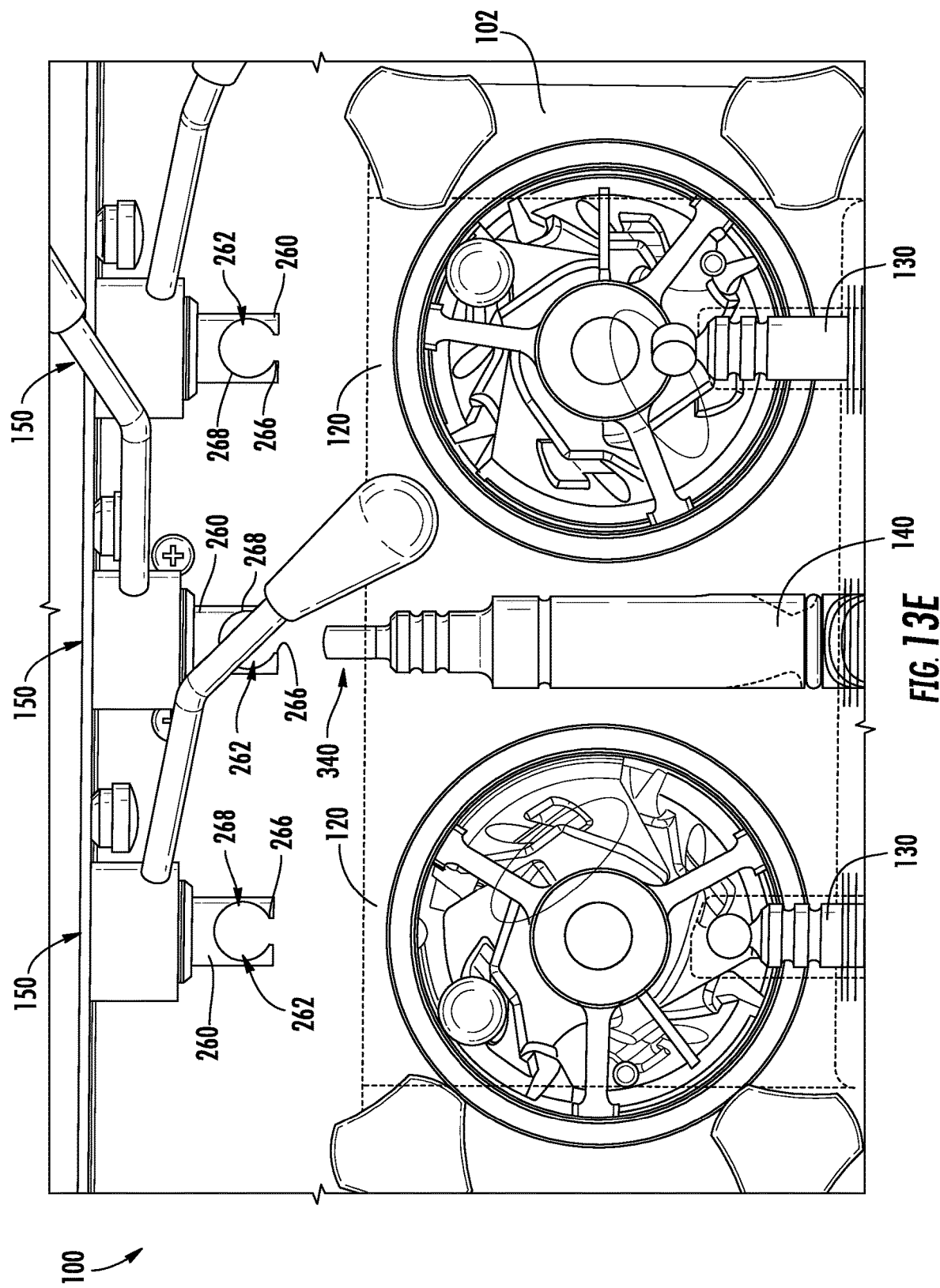
FIG. 13E is a front view of the dispensing system of FIG. 4 with the mixing spigot removed.

Referring to FIGS. 13A-13E, the process of removing the mixing spigot 140 from the front door 102 is shown. As shown in FIG. 13A, the mixing spigot 140 has been moved upwards from its normal operation position to a rotation position with the pin 366 proximate the connecting groove 364. As shown in FIG. 13B, the mixing spigot 140 is rotated to a removal orientation such that the pin 366 passes through the connecting groove 364 and into the removal groove 362. As shown in FIGS. 13C and 13E, when the pin 366 is fully within the removal groove 362, the portion of the key 344 of the actuator interface 340 having the smallest width (i.e., the minor key width H, the distance between the flat portions of the key 344) is aligned with the narrowest portion of the cutout 262 (i.e., the slot 266 having the slot width E, etc.). As shown in FIGS. 13C, 13D, and 13E, the mixing spigot 140 may then be pushed and/or pulled out of the bottom of the mixing valve passage 124. Because the removal groove 362 extends through the end of the main body 310, the pin 366 does not prevent removal of the mixing spigot 140. The removal process may be performed in reverse order to assemble the mixing spigot 140 into the actuator 150.

As shown in FIGS. 14A-14F, a side spigot 530 is illustrated according to an exemplary embodiment. The side spigot 530 is substantially the same as the side spigot 130, with elements identified with references numbers in the 600s for side spigot 530 being substantially the same as like elements identified in the 200s for the side spigot 130 and differences between the side spigot 530 and the side spigot 130 being described below.

The side spigot 530 includes a longitudinal axis 600, a main body 610, a neck portion 612, grooves 620, 624, and 626, an actuator interface 640, a neck 642 having a first neck width A and a second neck width C, and a key 644 having a minor key width B and a major key width D.

Figure 14A:
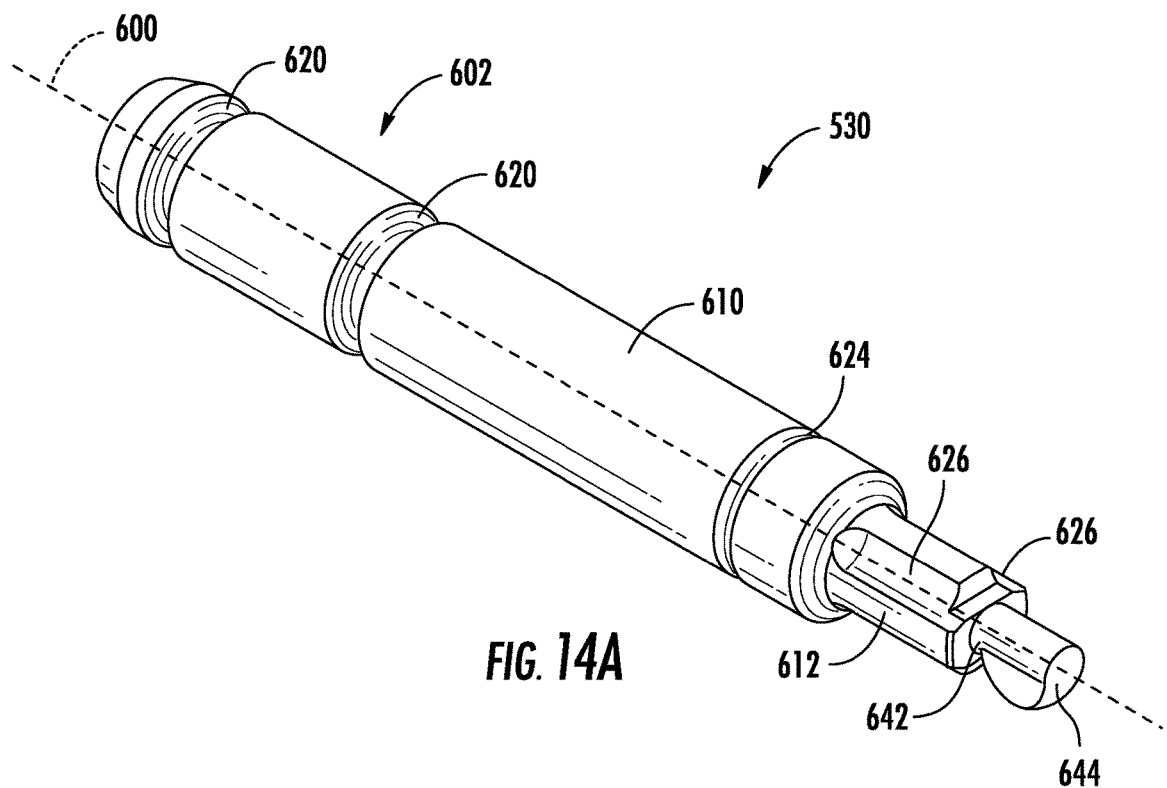
FIG. 14A is a perspective view of a side spigot, according to an exemplary embodiment.
Figure 14B:
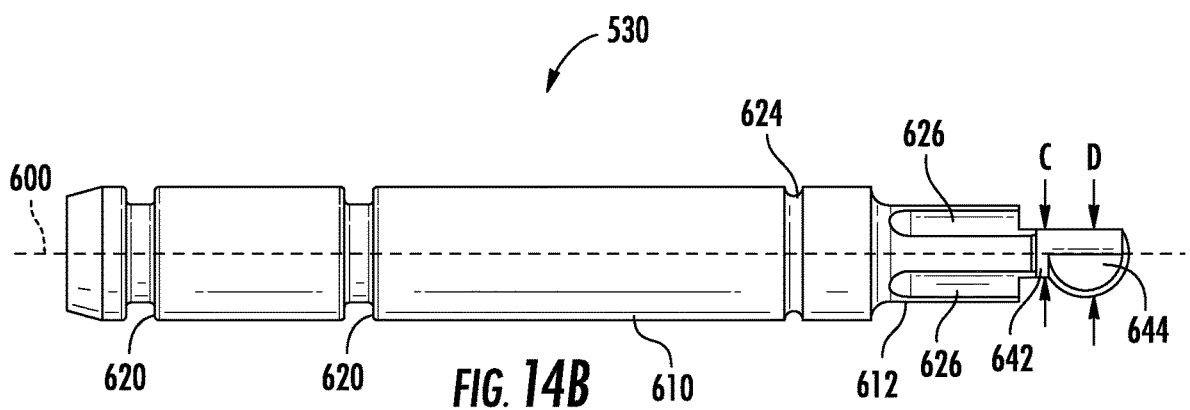
FIG. 14B is a right side view of the side spigot of FIG. 14A.
Figure 14C:
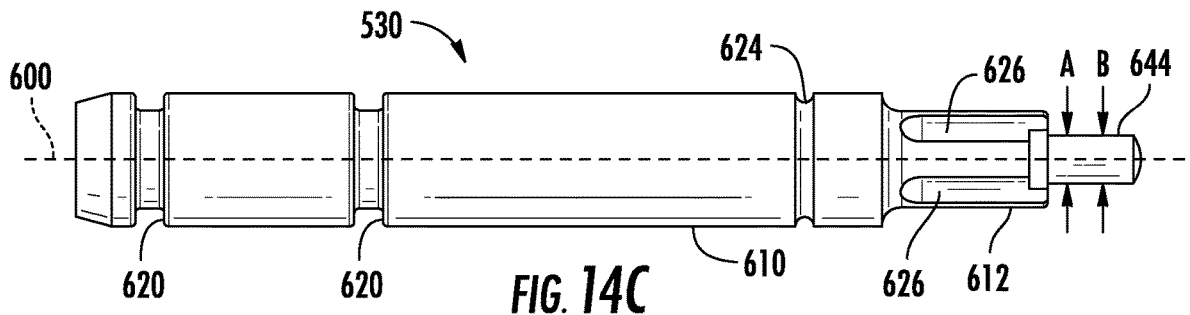
FIG. 14C is a top view of the side spigot of FIG. 14A.
Figure 14D:
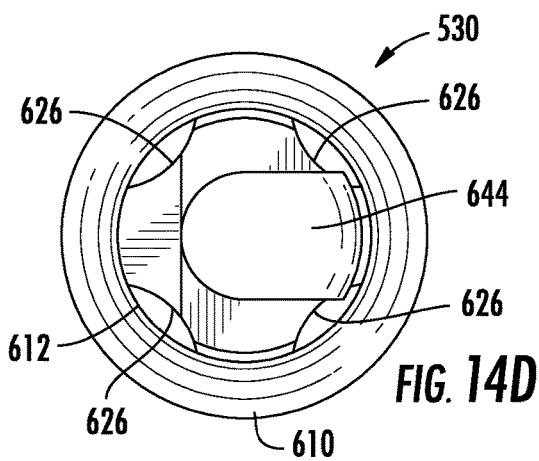
FIG. 14D is a front view of the side spigot of FIG. 14A.
Figure 14E:
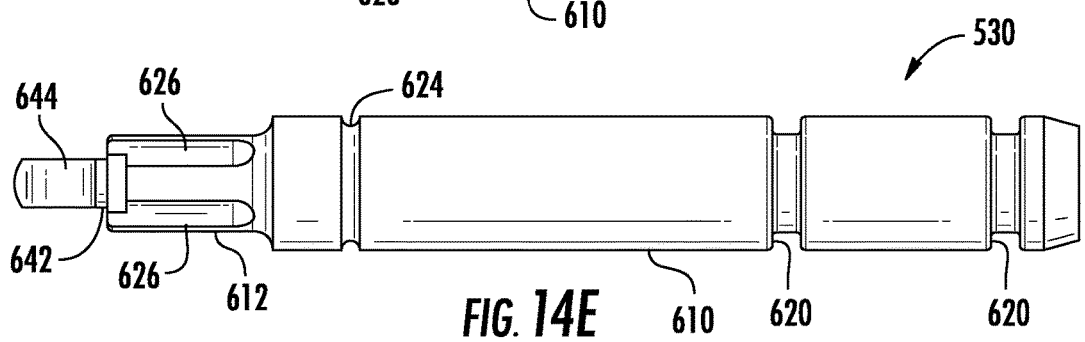
FIG. 14E is a bottom view of the side spigot of FIG. 14A.
Figure 14F:
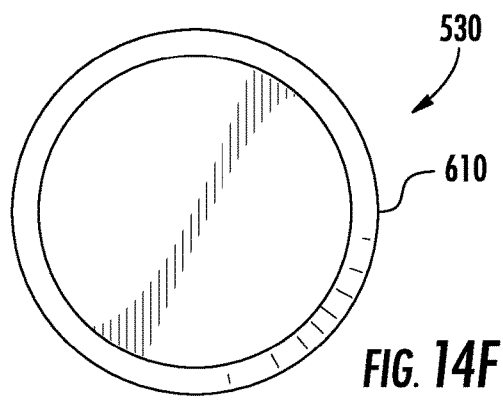
FIG. 14F is a rear view of the side spigot of FIG. 14A.
Figure 15A:
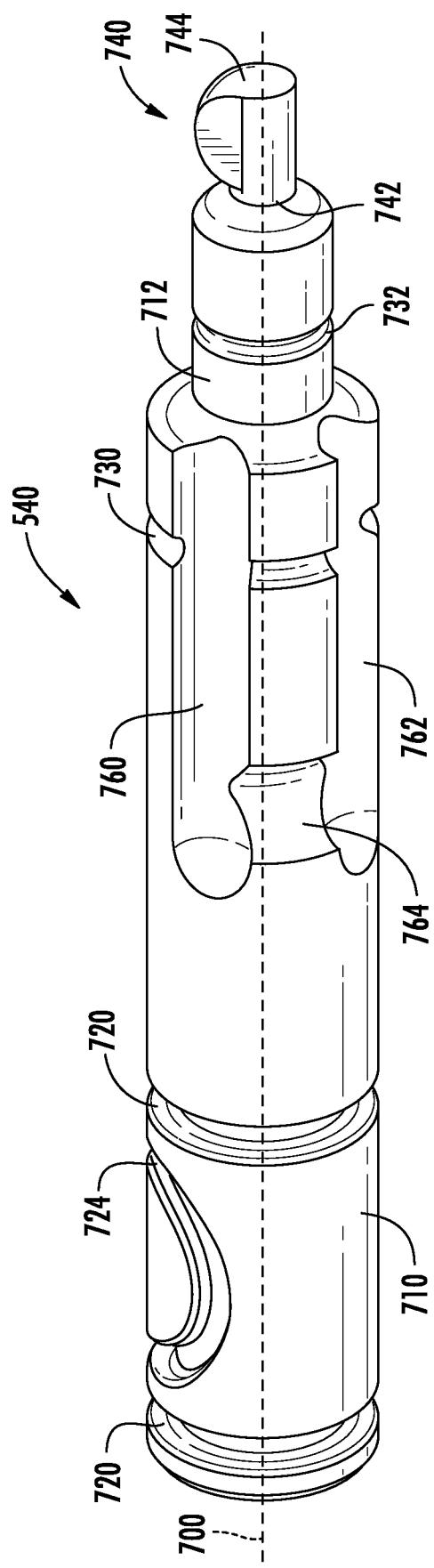
FIG. 15A is a perspective view of a mixing spigot, according to an exemplary embodiment.
Figure 15B:
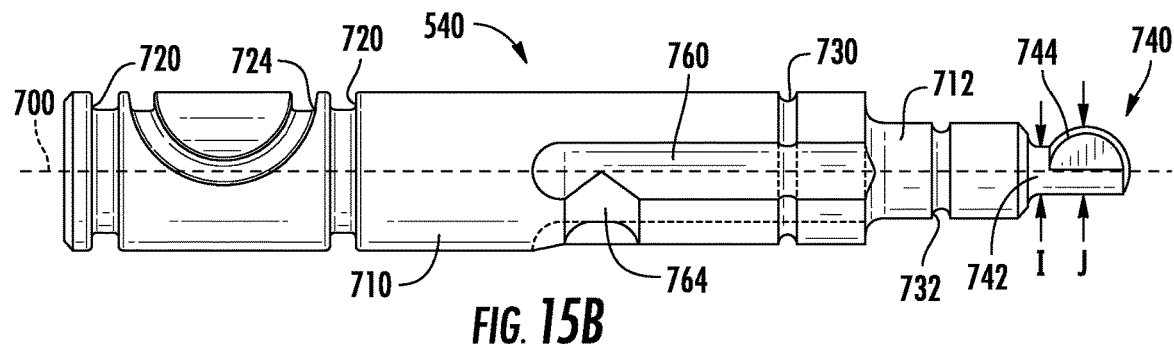
FIG. 15B is right side view of the mixing spigot of FIG. 15A.
Figure 15C:
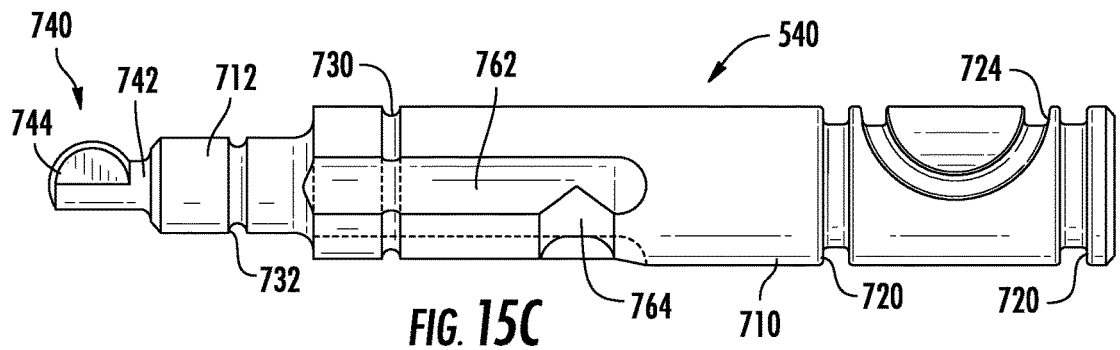
FIG. 15C is left side view of the mixing spigot of FIG. 15A.
Figure 15D:
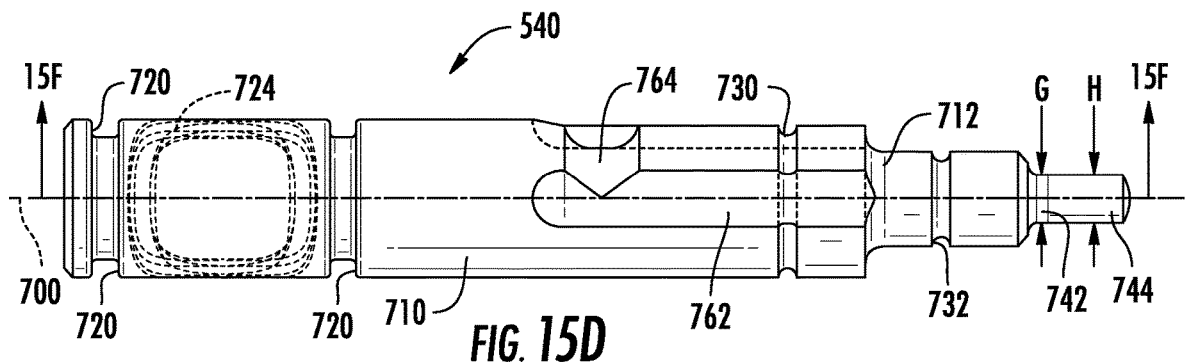
FIG. 15D is a bottom view of the mixing spigot of FIG. 15A.
Figure 15E:
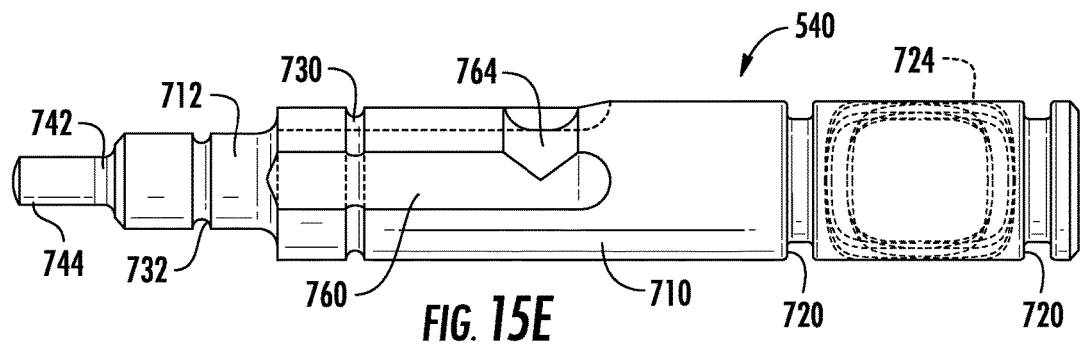
FIG. 15E is a top view of the mixing spigot of FIG. 15A.
Figure 15F:
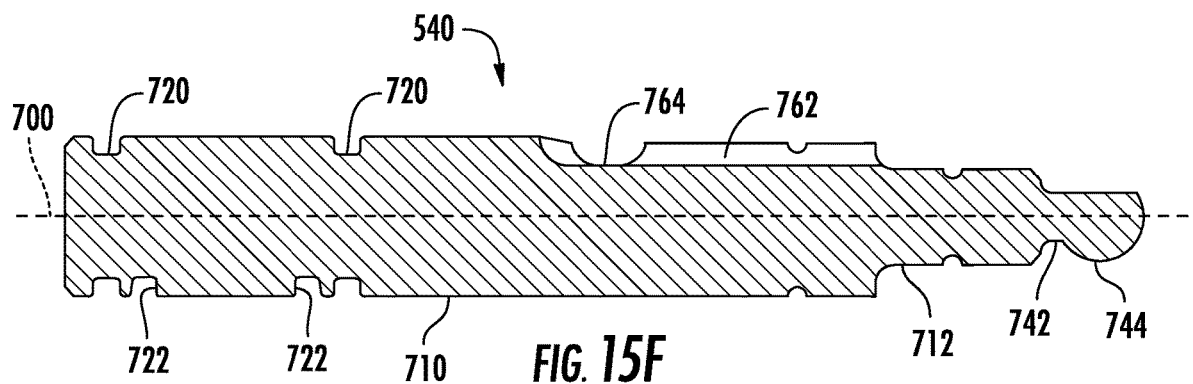
FIG. 15F is a section view of the mixing spigot of FIG. 15A taken along line 15F-15F in FIG. 15D.
Figure 15G:
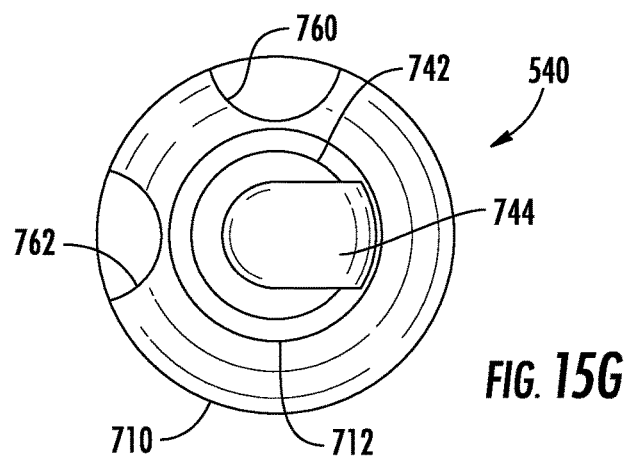
FIG. 15G is a front view of the mixing spigot of FIG. 15A.
Figure 15H:
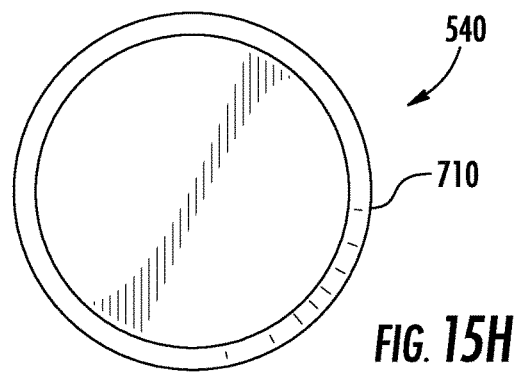
FIG. 15H is a rear view of the mixing spigot of FIG. 15A.

The key 644 does not have a full circular profile when viewed from a direction perpendicular to the major key width D as shown by a comparison of the key 244 as shown in FIG. 9C and the key 622 as shown in FIG. 14B. Rather, the key 644 is substantially semi-circular when viewed from this orientation. A third flat portion has been cut into a sphere, perpendicular to the two flat portions in the key 244 to form the key 644. The key 644 is a segment of a sphere and provides sufficient engagement with an actuator 150 when positioned within the cutout 262 in the normal operating position to secure the side spigot 530 to the actuator 150.

The grooves 626 formed in the neck portion 612 are arranged axially relative to the axis 600 as shown in FIG. 14, in contrast with the grooves 226 formed in the neck portion 212 that are arranged perpendicular to the axis 200 as shown in FIG. 9B. The axially arranged grooves 626 were found to provide improved grip to the user, particularly when the spigot 630 is wet or otherwise slippery.

As shown in FIGS. 15A-15H, a mixing spigot 540 is illustrated according to an exemplary embodiment. The mixing spigot 540 is substantially the same as the mixing spigot 540, with elements identified with references numbers in the 700s for mixing spigot 540 being substantially the same as like elements identified in the 300s for the mixing spigot 140 and differences between the mixing spigot 540 and the mixing spigot 140 being described below.

The mixing spigot 540 includes a longitudinal axis 700, a main body 710, a neck portion 712, grooves 720, 724, 730, and 732, an actuator interface 740, a neck 742 having a first neck width G and a second neck width I, a key 744 having a minor key width H and a major key width J, an operation groove 760, a removal groove 762, and a connecting groove 764. The key 744 has the same shape as the key 644.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A frozen food product dispensing machine, comprising:
    a housing;
    a freezer barrel;
    a cover coupled to the housing, the freezer barrel and the cover defining a food product volume configured to contain food product, wherein the cover defines a passage fluidly coupled to the food product volume;
    a spigot disposed within the passage and translatable along a longitudinal axis between a first position and a second position, the spigot including an actuator interface; and
    an actuator coupled to the spigot by the actuator interface;
    wherein the spigot prevents a flow of food product through the passage when in the first position, wherein the spigot allows the flow of food product through the passage when in the second position, wherein the actuator is configured to selectively move the spigot between the first position and the second position, and wherein the spigot is configured to be removed from the cover while the cover is coupled to the housing.

2. The frozen food product dispensing machine of claim 1, wherein the spigot is selectively coupled to the actuator, and wherein the spigot is configured to be decoupled from the actuator when the spigot is removed from the cover.

3. The frozen food product dispensing machine of claim 2, wherein the spigot is configured to be decoupled to from the actuator by rotating the spigot about the longitudinal axis.

4. The frozen food product dispensing machine of claim 1, wherein the spigot is configured to move away from the actuator when the spigot is removed from the cover.

5. The frozen food product dispensing machine of claim 4, wherein the spigot is configured to move along the longitudinal axis when the spigot is removed from the cover.

6. The frozen food product dispensing machine of claim 1, wherein the food product is configured to be dispensed through a lower end portion of the passage, and wherein the spigot is configured to pass through the lower end portion of the passage when the spigot is removed from the cover.

7. The frozen food product dispensing machine of claim 6, wherein the actuator interface is configured to pass through the lower end portion of the passage when the spigot is removed from the cover.

8. The frozen food product dispensing machine of claim 1, wherein the spigot further defines a first groove and a second groove extending around a circumference of the spigot, wherein the first groove is configured to receive a first resilient member, and the second groove is configured to receive a second resilient member, each configured to seal against an inner surface of the passage, wherein the passage is fluidly coupled to the food product volume by a feeding passage, and wherein the first resilient member is disposed on one side of the feeding passage and the second resilient member is disposed on an opposing side of the feeding passage when the spigot is located in the first position.

9. The frozen food product dispensing machine of claim 1, wherein the spigot defines a groove extending along the longitudinal axis, wherein the cover includes a pin extending into the passage and configured to extend into the groove.

10. The frozen food product dispensing machine of claim 9, wherein the groove is a first groove, wherein the spigot further defines a second groove intersecting the first groove, wherein the pin is fixed relative to the cover, and wherein the spigot is selectively rotatable by aligning the pin with the second groove.

11. The frozen food product dispensing machine of claim 10, wherein the spigot further defines a third groove intersecting the second groove, and wherein the pin is configured to travel along the third groove following rotation of the spigot to remove the spigot from the passage.

12. The frozen food product dispensing machine of claim 9, wherein the groove is a first groove, wherein the spigot further defines a second groove extending along the longitudinal axis and configured to receive the pin.

13. The frozen food product dispensing machine of claim 1, wherein the food product volume is a first food product volume, wherein the passage is fluidly coupled to the first food product volume by a first feeding passage, wherein the passage is fluidly coupled to a second food product volume by a second feeding passage, wherein the spigot defines a groove configured to receive a resilient member configured to seal against an inner surface of the passage, and wherein the resilient member fluidly decouples the first feeding passage and the second feeding passage when the spigot is in the first position.

14. The frozen food product dispensing machine of claim 1, wherein the spigot is configured to be selectively decoupled from the actuator by rotating the spigot about the longitudinal axis from a first orientation to a second orientation, wherein in the first orientation, the actuator interface engages the actuator to couple the spigot to the actuator, and wherein in the second orientation, the spigot is translatable along the longitudinal axis without the actuator interface engaging the actuator.

15. A frozen food product dispensing machine, comprising:
    a housing;
    a first freezer barrel and a second freezer barrel;
    a cover coupled to the housing, wherein the first freezer barrel and the cover define a first food product volume, wherein the second freezer barrel and the cover define a second food product volume, and wherein the cover defines a first passage fluidly coupled to the first food product volume and a second passage fluidly coupled to the second food product volume;
    a first spigot disposed within the first passage and translatable along a first axis;
    a second spigot disposed within the second passage and translatable along a second axis;
    a first actuator coupled to the first spigot and configured move the first spigot to control a flow of food product along the first passage; and
    a second actuator coupled to the second spigot and configured move the second spigot to control a flow of food product along the second passage, wherein the first spigot is configured to be selectively decoupled from the first actuator and removed from the cover while the second spigot is coupled to the second actuator.

16. The frozen food product dispensing machine of claim 15, wherein the first passage and the second passage extend parallel to one another, and wherein the first spigot is configured to move along the first axis when the first spigot is removed from the cover.

17. The frozen food product dispensing machine of claim 15, wherein food product is configured to be dispensed through a lower end portion of the first passage, and wherein the first spigot is configured to pass through the lower end portion of the first passage when the first spigot is removed from the cover.

18. The frozen food product dispensing machine of claim 15, wherein the first spigot is configured to be selectively decoupled from the first actuator by rotating the first spigot relative to the first actuator.

19. A method of disassembling a frozen food product dispensing machine, comprising:
  providing the frozen food product dispensing machine including:
    a housing;
    a freezer barrel;
    a cover coupled to the housing, the freezer barrel and the cover defining a food product volume, wherein the cover defines a passage fluidly coupled to the food product volume;
    a spigot disposed within the passage and translatable along a longitudinal axis, the spigot including an actuator interface; and
    an actuator coupled to the spigot by the actuator interface and configured move the spigot to control a flow of food product along the passage;
  decoupling the actuator from the actuator interface such that the spigot can translate along the longitudinal axis independent of the actuator; and
  moving the spigot along the passage and away from the actuator to remove the spigot from the cover,
  wherein the cover is coupled to the housing both when decoupling the actuator from the actuator interface and when removing the spigot from the cover.

20. The method of claim 19, wherein decoupling the actuator from the actuator interface includes rotating the actuator interface relative to the actuator.

* * * * *